(12) United States Patent
Hotta et al.

(10) Patent No.: US 9,475,446 B2
(45) Date of Patent: Oct. 25, 2016

(54) SIDE AIRBAG APPARATUS

(71) Applicant: TOYODA GOSEI CO., LTD., Kiyosu-shi, Aichi-ken (JP)

(72) Inventors: Masashi Hotta, Kiyosu (JP); Yuji Sato, Kiyosu (JP); Eiji Sato, Kiyosu (JP); Masao Kino, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/642,926

(22) Filed: Mar. 10, 2015

(65) Prior Publication Data

US 2015/0343980 A1  Dec. 3, 2015

(30) Foreign Application Priority Data

May 28, 2014 (JP) ................ 2014-110104

(51) Int. Cl.
| | |
|---|---|
| *B60R 21/207* | (2006.01) |
| *B60R 21/215* | (2011.01) |
| *B60R 21/231* | (2011.01) |
| *B60R 21/233* | (2006.01) |
| *B60R 21/239* | (2006.01) |

(52) U.S. Cl.
CPC .......... *B60R 21/207* (2013.01); *B60R 21/215* (2013.01); *B60R 21/231* (2013.01); *B60R 21/233* (2013.01); *B60R 21/239* (2013.01); *B60R 2021/21537* (2013.01); *B60R 2021/23146* (2013.01); *B60R 2021/23324* (2013.01)

(58) Field of Classification Search
CPC .............. B60R 21/207; B60R 21/215; B60R 21/2165; B60R 21/233; B60R 21/2334; B60R 21/261; B60R 2021/21537; B60R 2021/23146; B60R 2021/23324; B60R 2021/26094; B60R 2021/2612; B60R 2021/2615; B60R 21/231; B60R 21/239
See application file for complete search history.

(56) References Cited

U.S. PATENT DOCUMENTS

| | | | | |
|---|---|---|---|---|
| 5,785,350 A | * | 7/1998 | Inoue .................... | B60R 21/207 280/730.2 |
| 5,799,971 A | * | 9/1998 | Asada ................... | B60R 21/207 280/728.3 |
| 5,829,779 A | * | 11/1998 | Nakashima .......... | B60R 21/239 280/729 |
| 5,988,674 A | * | 11/1999 | Kimura ................ | B60R 21/207 280/728.3 |
| 6,062,594 A | * | 5/2000 | Asano ............... | B60R 21/23138 280/729 |
| 6,270,113 B1 | * | 8/2001 | Wipasuramonton | B60R 21/23138 280/728.1 |

(Continued)

FOREIGN PATENT DOCUMENTS

| | | | |
|---|---|---|---|
| JP | 09076865 A | * | 3/1997 |
| JP | H09-240413 A | | 9/1997 |

(Continued)

*Primary Examiner* — Laura Freedman
(74) *Attorney, Agent, or Firm* — Posz Law Group, PLC

(57) ABSTRACT

An airbag is stored in a storage portion provided in a side of the seat back of a car seat and fixed to a side frame portion. The airbag is deployed and inflated by inflation gas that is supplied in response to an impact from a side of the seat back. The airbag displaces a cover main body of a cover sideways from the seat back with a hinge portion function as a pivot, so that the storage portion is opened. The airbag includes an upstream inflation portion, which forms a rear part and receives inflation gas, and a downstream inflation portion, which is located forward of the upstream inflation portion. The downstream inflation portion receives inflation gas via the upstream inflation portion. The upstream inflation portion has a front end that is located forward of a front end of the cover when the upstream inflation portion is inflated.

5 Claims, 8 Drawing Sheets

(56) References Cited

U.S. PATENT DOCUMENTS

| | | | | |
|---|---|---|---|---|
| 6,302,431 B1* | 10/2001 | Sasaki | B60R 21/23138 | 280/728.2 |
| 6,478,329 B1* | 11/2002 | Yokoyama | B60R 21/23138 | 280/729 |
| 7,134,686 B2* | 11/2006 | Tracht | B60R 21/207 | 280/730.2 |
| 7,192,050 B2* | 3/2007 | Sato | B60R 21/23138 | 280/729 |
| 7,281,735 B2 | 10/2007 | Acker et al. | | |
| 7,393,005 B2 | 7/2008 | Inazu et al. | | |
| 7,637,530 B2* | 12/2009 | Yamaji | B60R 21/23138 | 280/730.2 |
| 7,669,889 B1* | 3/2010 | Gorman | B60R 21/207 | 280/730.2 |
| 7,798,523 B2* | 9/2010 | Shigemura | B60R 21/207 | 280/730.2 |
| 8,181,989 B2* | 5/2012 | Okuhara | B60R 21/207 | 280/729 |
| 8,286,995 B2* | 10/2012 | Shibayama | B60R 21/23138 | 280/730.2 |
| 8,419,060 B2* | 4/2013 | Yamamoto | B60R 21/23138 | 112/475.08 |
| 8,485,550 B2* | 7/2013 | Kino | B60R 21/207 | 280/730.2 |
| 8,528,934 B2* | 9/2013 | Kobayshi | B60R 21/207 | 280/729 |
| 8,562,015 B2* | 10/2013 | Yamamoto | B60R 21/231 | 280/729 |
| 8,602,449 B2 | 12/2013 | Kojima | | |
| 8,684,401 B2* | 4/2014 | Shibayama | B60R 21/263 | 280/730.2 |
| 8,696,021 B2* | 4/2014 | Yamamoto | B60R 21/23138 | 280/730.2 |
| 8,714,584 B2* | 5/2014 | Honda | B60R 21/233 | 280/729 |
| 8,714,588 B2* | 5/2014 | Honda | B60R 21/20 | 280/729 |
| 8,720,940 B2* | 5/2014 | Honda | B60R 21/23138 | 280/729 |
| 8,740,246 B2* | 6/2014 | Hotta | B60R 21/239 | 280/742 |
| 8,757,657 B1* | 6/2014 | Hotta | B60R 21/233 | 280/730.2 |
| 8,770,620 B2* | 7/2014 | Hotta | B60R 21/233 | 280/730.2 |
| 8,876,154 B2* | 11/2014 | Tracht | B60R 21/207 | 280/728.2 |
| 9,039,037 B2* | 5/2015 | Fukushima | B60R 21/233 | 280/730.2 |
| 9,085,280 B2* | 7/2015 | Katsumata | B60R 21/23138 | |
| 9,120,457 B2* | 9/2015 | Kino | B60R 21/207 | |
| 9,150,185 B2* | 10/2015 | Hotta | B60R 21/23138 | |
| 9,180,836 B2* | 11/2015 | Hotta | B60R 21/23138 | |
| 2005/0023808 A1* | 2/2005 | Sato | B60R 21/23138 | 280/730.2 |
| 2012/0025499 A1* | 2/2012 | Shibayama | B60R 21/233 | 280/730.2 |
| 2014/0151985 A1* | 6/2014 | Hotta | B60R 21/2334 | 280/730.2 |
| 2014/0183846 A1 | 7/2014 | Fujiwara et al. | | |
| 2015/0197212 A1* | 7/2015 | Fujiwara | B60R 21/233 | 280/729 |
| 2015/0239423 A1* | 8/2015 | Hayashi | B60R 21/231 | 280/729 |
| 2015/0274117 A1* | 10/2015 | Iida | B60R 21/23138 | 280/729 |

FOREIGN PATENT DOCUMENTS

| | | |
|---|---|---|
| JP | H10-006906 A | 1/1998 |
| JP | 10071918 A * | 3/1998 |
| JP | 2002-067857 A | 3/2002 |
| JP | 2003-127815 A | 5/2003 |
| JP | 2004-338708 A | 12/2004 |
| JP | 2006-205765 A | 8/2006 |
| JP | 2007-126029 A | 5/2007 |
| JP | 2009-184645 A | 8/2009 |
| JP | 2011-068197 A | 4/2011 |
| JP | 2011-068199 A | 4/2011 |
| JP | 2011-093479 A | 5/2011 |
| JP | 2012-192803 A | 10/2012 |
| JP | 2013-249007 A | 12/2013 |
| WO | 2010/131322 A1 | 11/2010 |
| WO | 2013/014800 A1 | 1/2013 |

* cited by examiner

SIDE AIRBAG APPARATUS

BACKGROUND OF THE INVENTION

The present invention relates to a side airbag apparatus that protects an occupant seated in a vehicle seat from an impact by deploying and inflating an airbag on a side of the occupant when the impact is applied to a vehicle.

A side airbag apparatus having an airbag and an inflator is widely known for protecting an occupant from an impact when the impact is applied to a car from a side to a car seat in which the occupant is seated, for example, due to a side collision. The airbag and the inflator are incorporated in the seat back of a car seat.

Japanese Laid-Open Patent Publication No. 9-240413 discloses a side airbag structure for a car seat, which includes a storage portion in a side portion of a seat back. An airbag is folded to be in a storage form. The airbag in the storage form is stored in the storage portion with an inflator and fixed to a seat frame. A cover with a hinge portion is provided on a side of the seat back to cover the storage portion. The storage portion also contains a guide piece, which is located forward of the airbag in the storage form and extends while being inclined forward.

In the side airbag structure, when an impact is applied from the side to a body side portion of the car, for example, to a side door, the inflator supplies inflation gas to the airbag. The inflation gas deploys and inflates the airbag, which in turn pushes the cover. The push displaces the cover sideways from the car seat with the hinge portion functioning as the pivot, thereby opening the storage portion. With a part (the part fixed to the seat frame) remaining in the storage portion, the airbag is deployed and inflated diagonally forward and sideways, that is, in a direction defined by the guide piece through the clearance between the guide piece and the cover. Thereafter, the airbag is deployed and inflated between the occupant and the body side portion, which is being deformed inward. The airbag restrains the occupant and reduces the impact that is transmitted from the side to the occupant through the body side portion.

In a car equipped with the above described side airbag structure mounted in the seat, the airbag is deployed and inflated in a narrow clearance between the seat back and the body side portion (for example, a side door). Further, when receiving an impact, the body side portion is displaced inward, which further narrows the clearance. To deploy and inflate an airbag in such a narrow clearance to restrain the occupant, it is required that the cover be quickly displaced to open the storage portion, thereby allowing the airbag to be quickly deployed and inflated beside the occupant. However, the side airbag apparatus of Japanese Laid-Open Patent Publication No. 9-240413, which includes a guide piece, is limited to the function of directing the airbag diagonally forward and thus does not meet the above demand.

SUMMARY OF INVENTION

It is an objective of the present invention to provide a side airbag apparatus that is capable of deploying and inflating an airbag in a storage portion.

To achieve the foregoing objective and in accordance with one aspect of the present invention, a side airbag apparatus including an airbag is provided. The apparatus is adapted for installation in a vehicle seat. The vehicle seat includes a storage portion in a side, a cover for covering the storage portion, and a hinge portion provided to the cover. The airbag is stored in the storage portion and fixed to the vehicle seat. In response to an impact from a side of the vehicle seat, inflation gas is supplied to deploy and inflate the airbag. The apparatus is configured such that at least a part that is forward of the hinge portion is displaced sideways from the vehicle seat with the hinge portion of the cover functioning as a pivot, so that the storage portion is opened to allow the airbag to be deployed and inflated forward. The airbag includes at least an upstream inflation portion and a downstream inflation portion. The upstream inflation portion forms at least a rear part of the airbag and receives inflation gas. At least a part of the downstream inflation portion is located forward of the upstream inflation portion. The downstream inflation portion receives inflation gas that has flowed through the upstream inflation portion. The upstream inflation portion has a front end that is located forward of a front end of the cover when the upstream inflation portion is inflated.

In the above-described configuration, when an impact is applied to the vehicle from the side of the vehicle seat, inflation gas is supplied to the airbag stored in the storage portion. The airbag includes at least an upstream inflation portion and a downstream inflation portion. The volume of the upstream inflation portion is smaller than the volume of an airbag formed by a single inflation portion. Further, the inflation gas is first supplied to the upstream inflation portion. Thus, the internal pressure of the upstream inflation portion starts to increase earlier and to a higher level than the case in which the airbag is formed by a single inflation portion. The upstream inflation portion is rapidly deployed and inflated to push the cover. The push quickly displaces at least part of a portion that is located forward of the hinge portion sideways from the vehicle seat with the hinge portion functioning as the pivot, thereby opening the storage portion. With a part (the part fixed to the vehicle seat) remaining in the storage portion, the upstream inflation portion is inflated such that the front end thereof reaches a position forward of the front end of the cover. That is, the upstream inflation portion is projected from the storage portion and inflated to reach a position forward of the storage portion.

The inflation gas is supplied to the downstream inflation portion after flowing through the upstream inflation portion. After the deployment and inflation of the upstream inflation portion, the inflation gas supplied to the downstream inflation portion causes at least a part of the downstream inflation portion in front of the upstream inflation portion to be deployed and inflated. The upstream inflation portion and the downstream inflation portion restrain the occupant and reduce the impact transmitted to the occupant from the side.

DETAILED DESCRIPTION OF THE PREFERRED EMBODIMENT

First Embodiment

Figure 1:
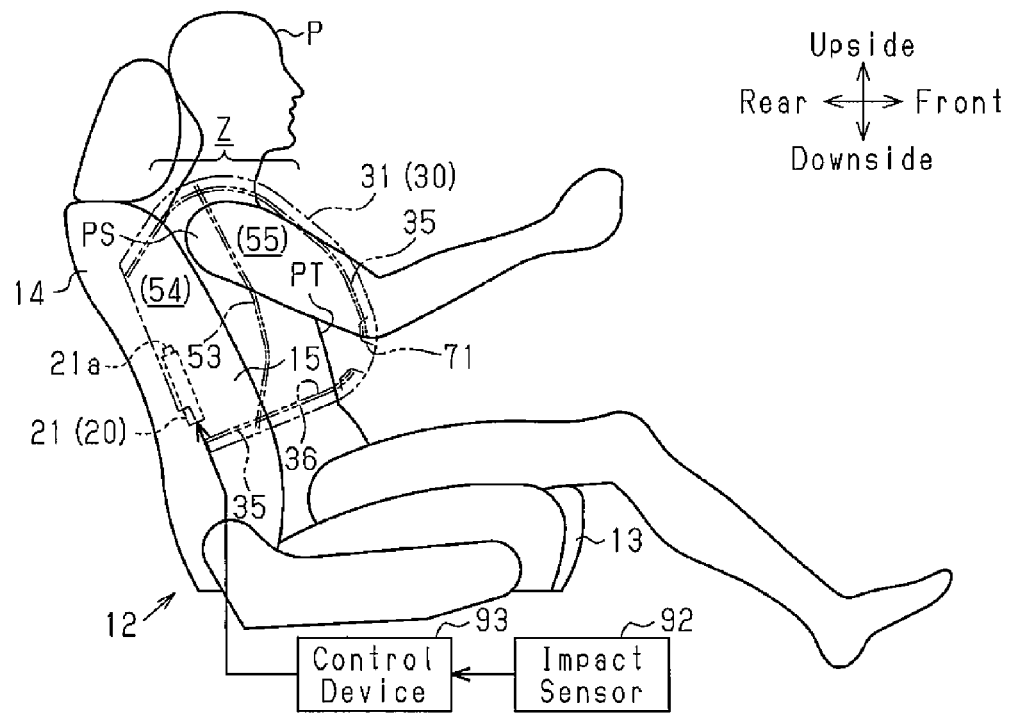
FIG. 1 is a side view of a car side airbag apparatus according to a first embodiment, illustrating, together with an occupant and an airbag main body, a car seat in which the apparatus is installed.

A car side airbag apparatus according to a first embodiment of the present invention will now be described with reference to FIGS. 1 to 9C.

In the following, the traveling direction of the car is defined as a forward direction. The backward, upward, and downward directions are defined with reference to the forward direction. In the drawings, the "inside" indicates the direction toward the center of the car, and the "outside" indicates the outward direction with respect to the car. Further, it is provided that an average sized occupant is seated on a car seat in a predetermined posture (normal posture).

Figure 2:
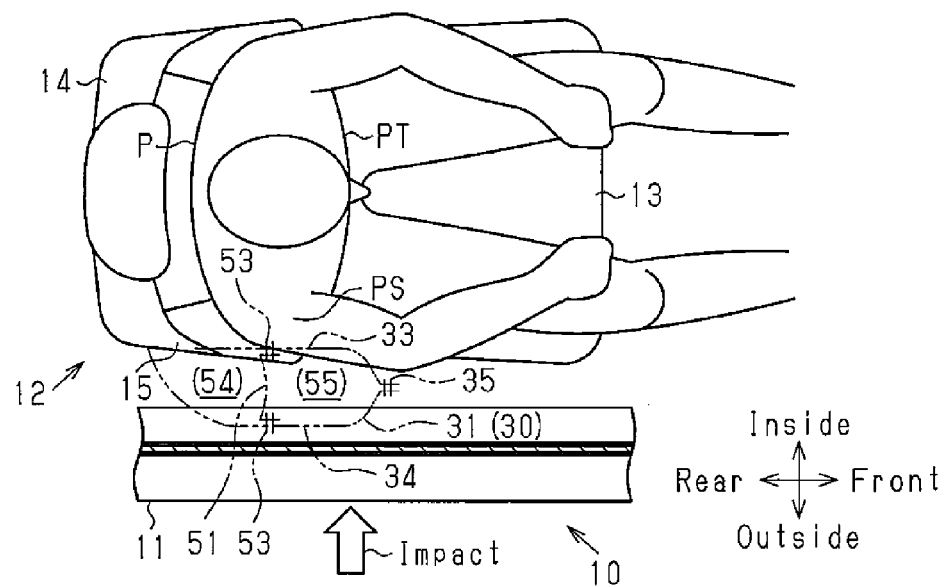
FIG. 2 is a cross-sectional plan view of the positional relationship of the car seat, the airbag, the occupant, and a body side portion in the embodiment of FIG. 1.
Figure 3:
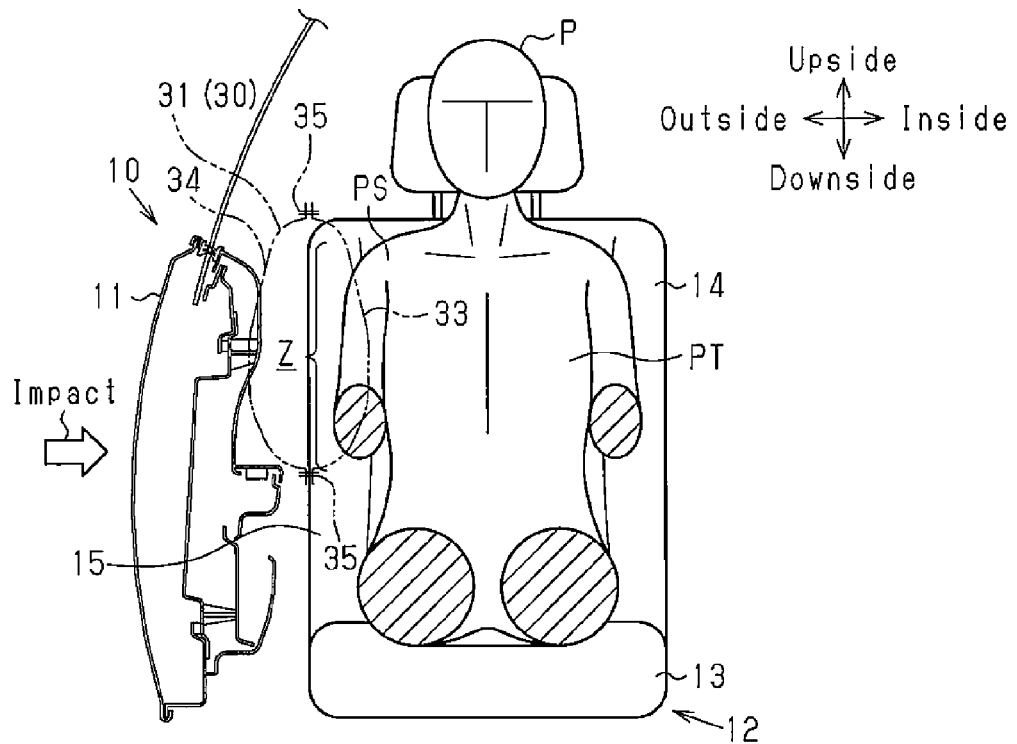
FIG. 3 is a cross-sectional front view of the positional relationship of the car seat, the airbag, the occupant, and the body side portion in the embodiment of FIG. 1.

As shown in FIGS. 1 to 3, a vehicle seat, which is a car seat 12 in this embodiment, is arranged on the inner side of a body side portion 11 of a car 10. The body side portion 11 refers to a car component that is located at a side of the car 10, and mainly corresponds to doors and pillars. For example, part of the body side portion 11 corresponding to the front seat includes a front door and a center pillar (B-pillar). Part of the body side portion 11 corresponding to the rear seat includes a rear part of the side door (rear door), a C-pillar, a front part of the wheel well, and the rear quarter.

The car seat 12 includes a seat cushion 13 and a seat back 14, which extends upward from the rear end of the seat cushion 13. The tilt angle of the seat back 14 is adjustable. The car seat 12 is arranged in the passenger compartment such that the seat back 14 faces the front side of the car 10. The widthwise direction of the car seat 12 thus matches with the widthwise direction of the car 10.

The internal structure of a side portion 15 of the seat back 14 on the outer side will now be described.

Figure 4:
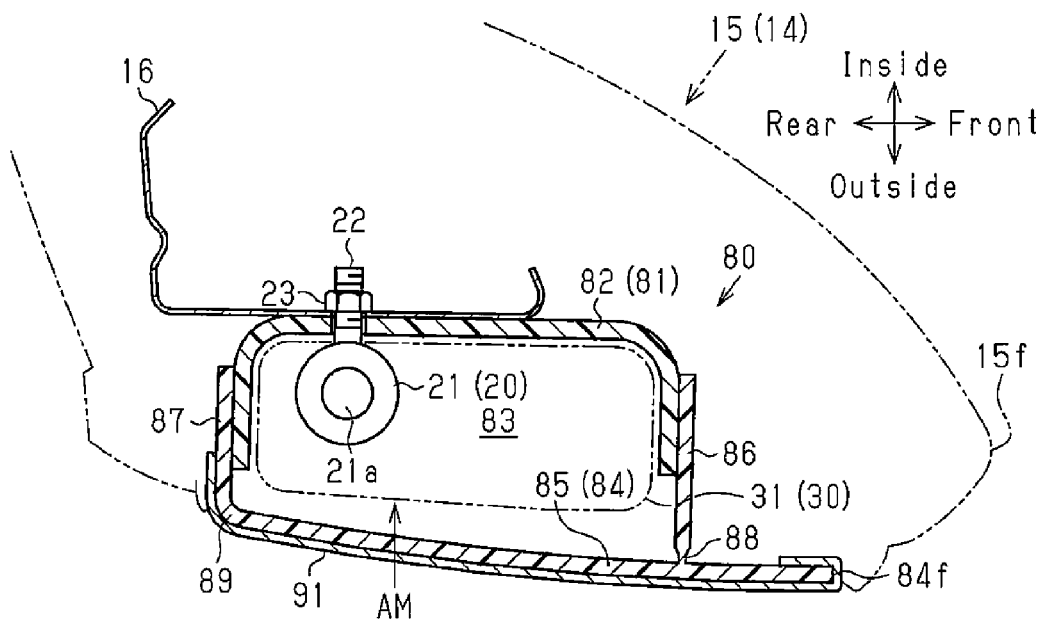
FIG. 4 is a partially cross-sectional plan view showing the internal structure of a side portion of the seat back in which the airbag module of the embodiment of FIG. 1 is stored and fixed.

The seat back 14 incorporates a seat frame, which forms the framework. A part of the seat frame forms a side frame portion 16, which is located in the side portion 15 as shown in FIG. 4. The side frame portion 16 is formed by bending a metal plate. A seat pad (not shown), which is made of an elastic material such as urethane foam, and upholstery (not shown) covering the seat pad are provided about the seat frame, which includes the side frame portion 16.

The side portion 15 accommodates an airbag module AM, which forms a main part of the side airbag apparatus, at a position outward of the side frame 16. The airbag module AM includes as its main components a gas generator 20 and an airbag 30. These components will now be described.

<Gas Generator 20>

As shown in FIGS. 4 and 7A, the main part of the gas generator 20 is formed by an inflator 21. The inflator 21 is substantially columnar. The inflator 21 stores a gas generating agent (not shown), which generates inflation gas. The inflator 21 has a gas outlet 21a at a first end (the upper end as viewed in FIG. 7A). A harness (not shown) for inputting activation signals to the inflator 21 is connected to a second end (the lower end as viewed in FIG. 7A) of the inflator 21.

The inflator 21, which uses a gas generating agent, is generally referred to as the pyrotechnic type. In place of the pyrotechnic type inflator, it is possible to use a hybrid type inflator, which discharges inflation gas by breaking, with a low explosive, a partition wall of a high-pressure gas cylinder filled with high-pressure gas.

The inflator 21 has bolts 22 (the number of which is two in the first embodiment) projecting from the outer circumferential surface. The bolts 22 are separated from each other in the axial direction of the inflator 21 and extend in a direction perpendicular to the axis of the inflator 21. The inflator 21 and the bolts 22 form the gas generator 20.

The bolts 22 may be indirectly fixed to the inflator 21. For example, a cylindrical retainer (not shown) may be attached to the outside of the inflator 21, and the bolts 22 may be fixed to the retainer. In this case, the inflator 21, the bolts 22, and the retainer form the gas generator 20.

As shown in FIGS. 1 and 2, the airbag 30 includes an airbag main body 31, which forms the outline, and a vertical partition 51 provided in the airbag main body 31.

<Airbag Main Body 31>

Figure 5:
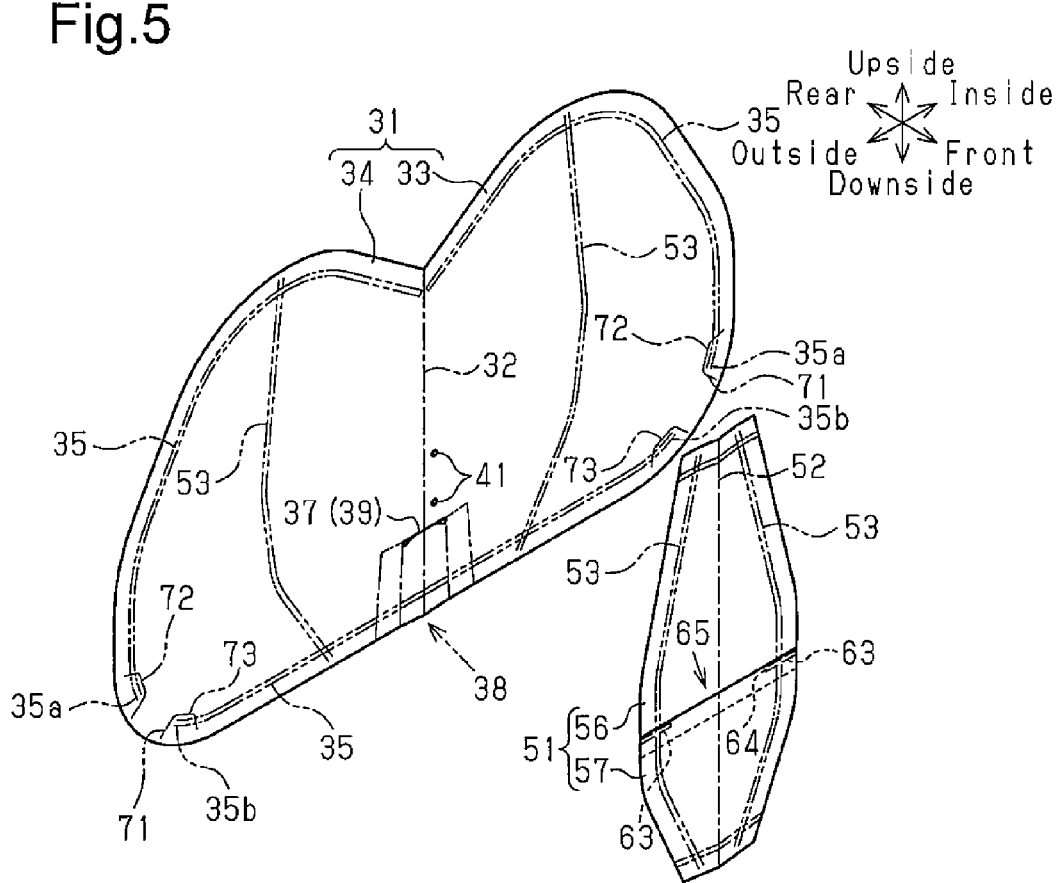
FIG. 5 is an exploded perspective view showing a spread state of the components of the airbag in the embodiment of FIG. 1.

The long dashed double-short dashed lines in FIG. 1 show a state in which the airbag main body 31 is deployed in a planar form without being filled with inflation gas (hereinafter, referred to as an uninflated and deployed state). FIG. 7A shows, together with car seat 12 and an occupant P, the airbag module AM in which the airbag main body 31 in the uninflated and deployed state is cut at the center portion of the car widthwise direction to show the internal structure of the airbag module AM. FIG. 5 shows the airbag main body 31 and the vertical partition 51, which form the airbag 30, in a spread state.

As shown in FIGS. 5 and 7A, the airbag main body 31 is formed by folding forward a single fabric piece (also referred to as a base fabric or a fabric panel) in half along a folding line 32 to be overlapped in the car widthwise direction and joining the overlapped parts. To distinguish the two overlapped parts of the airbag main body 31, the part located on the inner side will be referred to as a main body fabric portion 33, and the part located on the outer side will be referred to as a main body fabric portion 34.

In the first embodiment, the fabric piece is folded in half such that the folding line 32 is located at the rear end of the airbag main body 31. However, the fabric piece may be folded in half such that the folding line 32 is located at another end such as the front end, the upper end, or the lower end. The airbag main body 31 may also be formed of two fabric pieces divided along the folding line 32. Furthermore, the airbag main body 31 may be formed of three or more fabric pieces.

As shown in FIG. 5, in the airbag main body 31, the outer shapes of the main body fabric portions 33, 34 are symmetric with respect to the folding line 32. As illustrated in FIG. 7A, an area of the upper body of the occupant P seated in the car seat 12 ranging from the shoulder region PS to the thorax PT below will be referred to as a protection area Z, which is protected by the airbag main body 31. The protection area Z includes a front protection area ZF, which includes a front part of the thorax PT, and a rear protection area ZR, which includes a rear part of the thorax PT and the shoulder region PS. The shapes and sizes of the main body fabric portions 33, 34 are set such that when the airbag main body 31 is deployed and inflated, the airbag main body 31 occupies the space beside the protection area Z.

The main body fabric portions 33, 34 are preferably formed of a material having high strength and flexibility to be easily folded. The material may be, for example, woven cloth formed of polyester threads or polyamide threads.

The main body fabric portions 33, 34 are joined together at peripheral joint portions 35 provided at the peripheral portions. In the first embodiment, the peripheral joint portions 35 are formed by sewing (with sewing threads) parts of the peripheral portions of the main body fabric portions 33, 34 except for the rear end (the part in the vicinity of the folding line 32). Such joint through sewing is also applied to vertical joint portions 53, side joint portions 63, 106, 107, surrounding joint portions 72, 73, and joint portions 111, 112, which will be discussed below.

Figure 8:
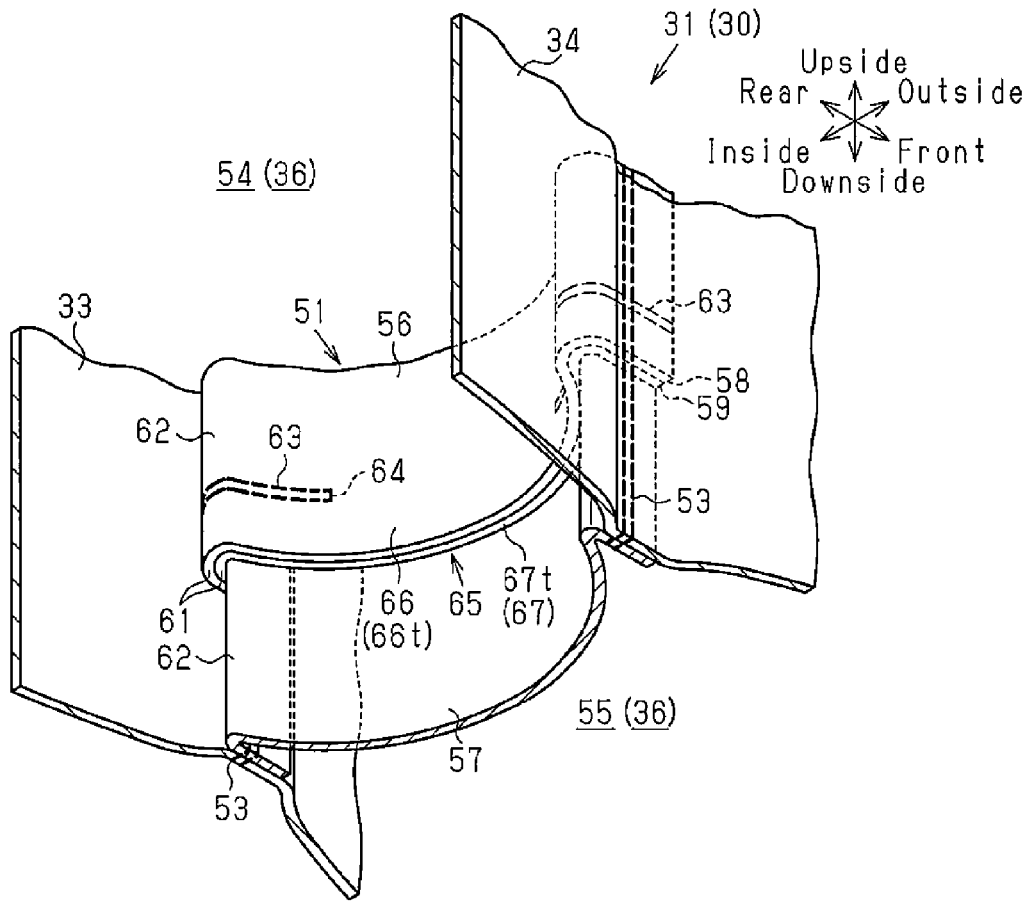
FIG. 8 is a partial perspective view showing a pressure regulator valve and the surroundings when the vertical partition of the embodiment of FIG. 1 is tensioned.

The sewn portions are depicted by first to third different broken lines in FIGS. 5, 7A, and 8. The same applies to FIGS. 10 and 12, which will be used for describing a second embodiment below. The first broken line includes thick line segments with a certain length arranged intermittently and represents sewing threads as viewed from the side (refer to the vertical joint portions 53 in FIGS. 7A and 8). The second broken line includes thin line segments with a certain length (longer than that of a typical broken line) arranged intermittently and represents the state of sewing threads that are located, for example, behind a fabric piece and cannot be seen directly (refer to the side joint portions 63 in FIGS. 5 and 7A). The third broken includes dots arranged at predetermined intervals and represents the cross-section of the sewing threads extending along a plane that passes through the sewn portions (refer to the peripheral joint portions 35 in FIG. 7A).

The peripheral joint portions 35 may be formed by a method other than sewing using sewing threads. For example, the peripheral joint portions 35 may be formed by adhesion with an adhesive. Such an alternative joining method may also be applied to the vertical joint portions 53, the side joint portions 63, 106, 107, the surrounding joint portions 72, 73, and the joint portions 111, 112, which will be discussed below.

As shown in FIG. 7A, a space between the main body fabric portions 33, 34 and surrounded by the peripheral joint portions 35 forms an inflation portion 36. The inflation portion 36 is deployed and inflated beside the protection area Z of the occupant by the inflation gas, thereby restraining the occupant P at the protection area Z, thereby protecting the occupant P from the impact.

A slit 37 extending in a direction perpendicular to the folding line 32 is formed at the rear end of the folded airbag main body 31 and in a middle portion in the vertical direction (see FIG. 5). A part of the main body fabric portions 33, 34 below the slit 37 forms an inward folding portion 38, which is folded inward in relation to the remaining parts of the airbag main body 31. The lower end of the inward folding portion 38 is sewn and joined to the remaining parts of the main body fabric portions 33, 34 by the peripheral joint portions 35. When the inward folding portion 38 is formed, the slit 37 is opened to form an insertion port 39 for the gas generator 20.

As shown in FIG. 5, bolt holes 41 for inserting the bolts 22 of the gas generator 20 (see FIG. 4) are formed at positions (two positions) above the slit 37 in the main body fabric portion 33 on the inner side.

The inside of the inflation portion 36 is divided into two sections by the vertical partition 51. The vertical partition 51 has the same structure as a component generally referred to as a tether.

<Vertical Partition 51>

As shown in FIG. 7A, when the airbag main body 31 is in the uninflated and deployed state, the vertical partition 51 is folded in half along a folding line 52, which extends substantially vertically between the main body fabric portions 33, 34. The upper end and the lower end of the vertical partition 51, which is folded in half, are sewn and joined to the upper end and the lower end of the main body fabric portions 33, 34 by the peripheral joint portions 35. As shown in FIG. 5, the vertical partition 51 in a spread state has a vertically elongated shape with the vertical dimension longer than the dimension in the car widthwise direction.

As shown in FIGS. 7A and 8, the vertical partition 51 is joined to the main body fabric portions 33, 34 by the two vertical joint portions 53 substantially at the middle position in the front-rear direction of the protection area Z. The vertical joint portions 53 extend substantially vertically along peripheral portions on the opposite sides of the vertical partition 51 in the car widthwise direction. The vertical partition 51 bridges between the main body fabric portions 33, 34 by the above described joining operation. Part of the inflation portion 36 rearward of the vertical partition 51 forms an upstream inflation portion 54, which is deployed and inflated beside the rear protection area ZR of the occupant P. Also, part of the inflation portion 36 forward of the vertical partition 51 forms a downstream inflation portion 55, which is deployed and inflated beside the front protection area ZF of the occupant P.

The vertical partition 51 is made of a material similar to that of the main body fabric portions 33, 34 of the airbag main body 31 and is formed by two fabric pieces 56, 57, which are arranged in the vertical direction.

As shown in FIGS. 7A, 7B, and 8, a lower end 58 of the fabric piece 56 and an upper end 59 of the fabric piece 57 are overlaid onto each other in a band-like shape to form a pair of overlapping portions 61 and a non-overlapping portion 62. The non-overlapping portion 62 is formed by a part different from the overlapping portions 61. The fabric pieces 56, 57 are joined to each other at the boundary between the pair of overlapping portions 61 and the non-overlapping portion 62 by the side joint portions 63, which extends in the car widthwise direction. At least one of the fabric pieces 56, 57 may be divided into two along the folding line 52.

The vertical partition 51 includes a communication portion 64 and a pressure regulator valve 65, which serve as a gas flow restricting portion.

<Communication Portion 64 and Pressure Regulator Valve 65>

The communication portion 64 and the pressure regulator valve 65 are provided substantially at the middle in the car widthwise direction in the vertical partition 51, which is tensioned by inflation of the upstream inflation portion 54. The communication portion 64 and the pressure regulator valve 65 are closed or substantially closed until a condition is met that the communication portion 64 and the pressure regulator valve 65 receive external force due to restraint of the occupant by the upstream inflation portion 54. The communication portion 64 and the pressure regulator valve 65 are opened when the condition is met. Specifically, the side joint portions 63 of the vertical partition 51 are joined to each other substantially at the center in the car widthwise direction. The parts that are not joined extend in the car widthwise direction and form the slit-like communication portion 64, which connects the upstream inflation portion 54 to the downstream inflation portion 55.

The pressure regulator valve 65 regulates the flow of inflation gas through the communication portion 64 to control the internal pressure of the upstream inflation portion 54 and the downstream inflation portion 55. Part of the lower end 58 of the fabric piece 56 corresponding to the communication portion 64 forms a valve member 66 of the pressure regulator valve 65, and part of the upper end 59 of the fabric piece 57 corresponding to the communication portion 64 forms a valve member 67 of the pressure regulator valve 65.

Figure 9A:
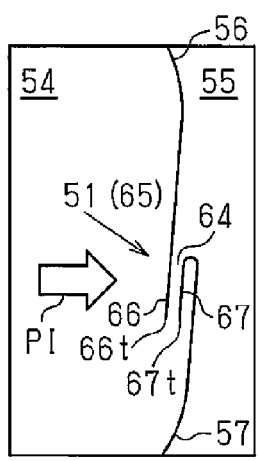
FIGS. 9A to 9C are partial cross-sectional side views schematically showing a series of actions of the communication portion and the pressure regulator valve according to the embodiment of FIG. 1.
Figure 9B:
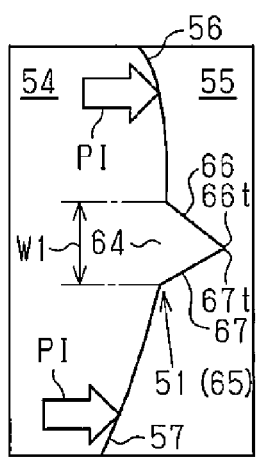

When the valve members 66, 67 contact each other at least partially, for example, at the distal ends 66t, 67t, the flow of the inflation gas through between the valve members 66, 67 is restricted (see FIGS. 9A, 9B). This state of the pressure regulator valve 65 is referred to as a valve closing state. Also, when the communication portion 64 is opened and the entire valve member 66 is separated from the entire valve member 67, inflation gas is allowed to flow through between the valve members 66, 67 (see FIG. 9C). This state of the pressure regulator valve 65 is referred to as a valve opening state.

The overlapping portions 61 are folded upward or downward (downward in the first embodiment) at the boundary with the non-overlapping portions 62 and are overlaid onto the corresponding non-overlapping portion 62. Further, the ends of the folded band-like overlapping portions 61 in the car widthwise direction are joined by sewing to the corresponding main body fabric portions 33, 34 of the airbag main body 31 and the non-overlapping portion 62 via the above-mentioned vertical joint portions 53.

As shown in FIGS. 5 and 7A, the airbag main body 31 has a vent hole 71. More specifically, at the lower front end of the downstream inflation portion 55, the main body fabric portion 33, 34 are joined by the peripheral joint portions 35. The peripheral joint portions 35 thus respectively have ends 35a, 35b separated from each other. The airbag main body 31 has surrounding joint portions 72, which join the main body fabric portions 33, 34 to each other while surrounding the ends 35a, and surrounding joint portions 73, which join the main body fabric portions 33, 34 while surrounding the ends 35b. The part that is between the main body fabric portions 33, 34 and between the surrounding joint portions 72, 73 does not function to join the peripheral portions of the main body fabric portions 33, 34 to each other, but forms the vent hole 71, which connects the inside and the outside of the downstream inflation portion 55 to each other. The inflation gas in the downstream inflation portion 55 is discharged to the outside through the vent hole 71.

While being held substantially vertically as shown in FIG. 7A, most part of the inflator 21 except for the lower part is inserted into the rear end of the upstream inflation portion 54 through the insertion port 39. Further, the bolts 22 (see FIG. 4) are inserted into the bolt holes 41 (see FIG. 5) of the airbag main body 31, so that the gas generator 20 is positioned with respect to and secured to the rear end of the upstream inflation portion 54.

The airbag module AM is stored in a case 80.

<Case 80>

As shown in FIG. 4, the case 80 includes a housing 81 made of a hard material and a cover 84 made of a hard material. The housing 81 forms the main part of the case 80 and shaped as a box with an opening facing toward the outside of the car. The housing 81 may be formed of plastic, for example. The main part of the housing 81 is formed by a plate-like side wall portion 82, which extends in the front-rear direction and the vertical direction. The interior space of the housing 81 forms a storage portion 83, which stores the airbag 30 and the inflator 21. The airbag main body 31 in an uninflated and deployed state (see FIG. 7A) is folded into a compact form (hereinafter, referred to as a storage form) shown by a long dashed double-short dashed line in FIG. 4. The airbag main body 31 in the storage form is arranged in the storage portion 83. Further, the bolts 22 of the gas generator 20, which is secured to the upstream inflation portion 54, are passed through the side wall portion 82 of the housing 81.

The cover 84 includes a cover main body 85, a front wall portion 86, and a rear wall portion 87. The cover main body 85 is shaped as a plate that is located on the outer side of the housing 81 and extends substantially in the front-rear direction and the vertical direction. The front wall portion 86 is shaped like a plate that extends inward from the front end of the cover main body 85. The rear wall portion 87 is shaped like a plate that extends inward from the rear end of the cover main body 85. The cover 84 may be formed of plastic, for example. The term "hard" refers to a state of being harder than the seat pad, which is a part of the seat back 14, and the upholstery that covers the seat pad. Thus, the materials that can be used for forming the cover 84 include soft plastic such as thermoplastic olefin (TPO). The front wall portion 86 is placed over the housing 81 from front and the rear wall portion 87 is placed over the housing 81 from behind, so that the storage portion 83 is covered with the cover 84. The cover 84 is fixed to the housing 81 by fastening means such as adhesion and welding at the front wall portion 86 and the rear wall portion 87.

The cover 84 has a breakable portion 88 at the boundary between the front wall portion 86 and the cover main body 85 in the cover 84. The breakable portion 88 has a lower strength than the other parts and is designed to be broken by the airbag main body 31 being deployed and inflated. The breakable portion 88, for example, has a long groove extending vertically and therefore has a smaller thickness than the other parts of the front wall portion 86. Alternatively, several short grooves may be arranged along the vertical direction.

The boundary between the cover main body 85 and the rear wall portion 87 forms a hinge portion 89, which serves as a pivot when the cover 84 is broken at the breakable portion 88 and the cover main body 85 separated from the front wall portion 86 is displaced. Upholstery 91 is laid on the cover main body 85 and a part of the rear wall portion 87. The upholstery 91 is made of a similar material as the above described upholstery for the seat pad.

The bolts 22, which protrude from the housing 81, are passed through the side frame portion 16. Nuts 23 are threaded to the bolts 22, which are passed though the side frame portion 16, so that the gas generator 20 is fixed to the side frame portion 16 together with the airbag main body 31 and the case 80.

The inflator 21 may be fixed to the side frame portion 16 using members other than the bolts 22 and the nuts 23.

As shown in FIG. 1, the side airbag apparatus includes an impact sensor 92 and a controller 93 in addition to the above described airbag module AM. The impact sensor 92 includes an acceleration sensor and detects an impact applied on the body side portion 11 from the side. The controller 93 controls activation of the inflator 21 based on a detection signal from the impact sensor 92.

The car 10 is equipped with a seat belt apparatus for restraining the occupant P seated on the car seat 12. However, illustration of the seat belt apparatus is omitted in FIG. 1.

The side airbag apparatus of the first embodiment is constructed as described above. The typical operation mode will now be described as operation of the side airbag apparatus.

Figure 9C:
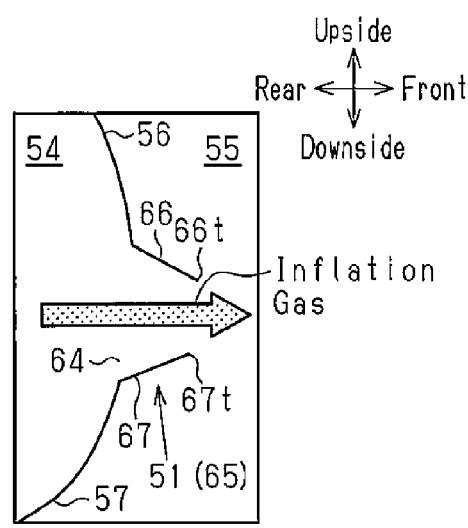

FIGS. 9A to 9C schematically show changes of the pressure regulator valve 65 and the vertical partition 51 over time after the inflation gas starts to be supplied to the airbag 30, and detailed parts are omitted or simplified.

According to this side airbag apparatus, when the impact sensor 92 does not detect any impact from the side of the body side portion 11, the controller 93 does not output to the inflator 21 an activation signal for activating the inflator 21. Thus, the inflator 21 does not discharge inflation gas. The airbag main body 31 thus remains stored in the storage portion 83 in the storage form (refer to the long dashed double-short dashed line in FIG. 4).

When the impact sensor 92 detects that an impact of a magnitude greater than or equal to a predetermined value has been applied to the body side portion 11 due to a side collision or the like while the car 10 is running, the controller 93, based on the detection signal, outputs a signal for activating the inflator 21 to the inflator 21. In response to the activation signal, the inflator 21 discharges inflation gas through the gas outlet 21a. When the inflation gas is supplied to the upstream inflation portion 54 of the airbag main body 31, which is in the storage form, the internal pressure is increased. This starts inflating the upstream inflation portion 54, causing the upstream inflation portion 54 to act to be unfolded (deployed) in the reverse order of that when it was folded.

The vertical partition 51, which is folded in half, is pulled in the car widthwise direction by the upstream inflation portion 54, which is deployed and inflated. As shown in FIG. 9A, an internal pressure PI is applied to the valve members 66, 67 of the pressure regulator valve 95 in the overlapping direction (the thickness direction). The valve members 66, 67 are brought into close contact in the entire surfaces with each other by the internal pressure PI, and are in a self-sealing state, which restricts the flow of the inflation gas through between the valve members 66, 67. Furthermore, the overlapping portions 61, which have been folded and overlaid onto the lower non-overlapping portion 62, are pressed against the non-overlapping portion 62 by the internal pressure (see FIG. 8). This allows the valve members 66, 67 to be further easily closed.

Since the dimension of the vertical partition 51 in the vertical direction is longer than that in the car widthwise direction (see FIG. 5), the vertical partition 51 tends to receive a greater tension in the car widthwise direction than in the vertical direction. Since the communication portion 64 extends in the car widthwise direction in which strong tension is likely to be applied, the communication portion 64 is easily closed.

Further, when the upstream inflation portion 54 is deployed and inflated, strong tension in the car widthwise direction is applied not only to the non-overlapping portion 62, but also to the overlapping portions 61. This is because the ends in the car widthwise direction of the overlapping portions 61 are joined to the main body fabric portions 33, 34.

When the valve members 66, 67 at least partially contact each other, the pressure regulator valve 65 is closed or substantially closed. The inflation gas in the upstream inflation portion 54 is restricted from flowing between the valve members 66, 67 and via the communication portion 64 into the downstream inflation portion 55. The restriction of gas flow causes the inflation gas to be accumulated in the upstream inflation portion 54, so that the internal pressure of the upstream inflation portion 54 is mainly increased.

In the first embodiment, the inflation portion 36 is divided into two sections, which are the upstream inflation portion 54 and the downstream inflation portion 55 by the vertical partition 51. The volume of the upstream inflation portion 54 is smaller than the volume of the inflation portion 36 in a case in which the inflation portion 36 is not divided by the vertical partition 51, that is, the airbag 30 is formed by a single inflation portion. Further, the inflation gas is first supplied to the upstream inflation portion 54 in the airbag 30. Thus, the internal pressure of the upstream inflation portion 54 starts to increase earlier and to a higher level than the case in which the airbag 30 is formed by a single inflation portion.

The upstream inflation portion 54, of which the internal pressure is increased, is deployed and inflated to push the cover 84. At this time, the side wall portion 82 of the housing 81 functions as a pressure receiving portion. That is, the side wall portion 82 receives the pressure of the inflation gas flowing toward the center of the car and generates an outward reaction force. This allows the pressure of the inflation gas to be effectively used for pressing the cover 84.

Figure 6:
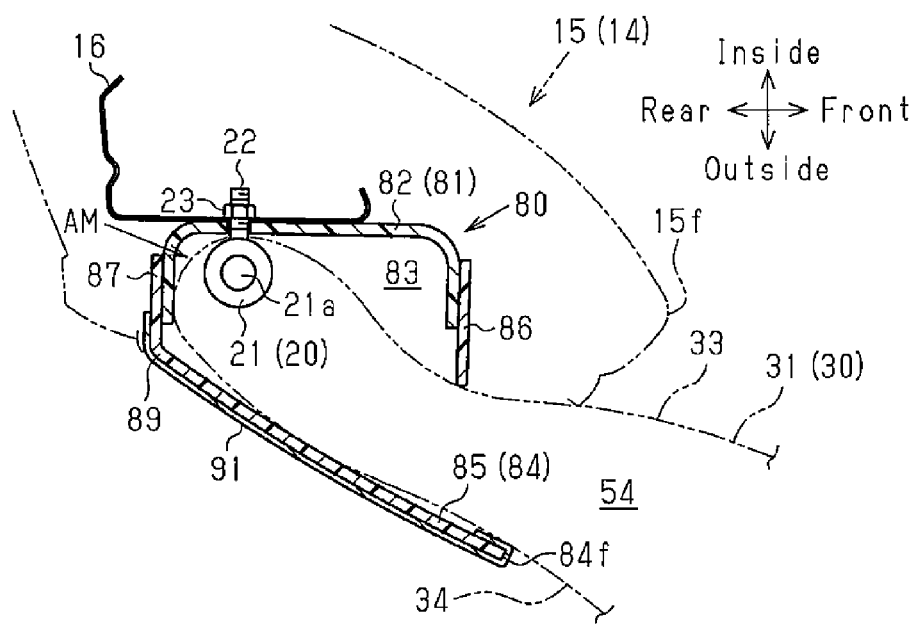
FIG. 6 is a partial cross-sectional plan view illustrating a state in which the airbag main body of FIG. 4 has been projected from the storage portion to be deployed and inflated with a part remaining in the storage portion.
Figure 7:
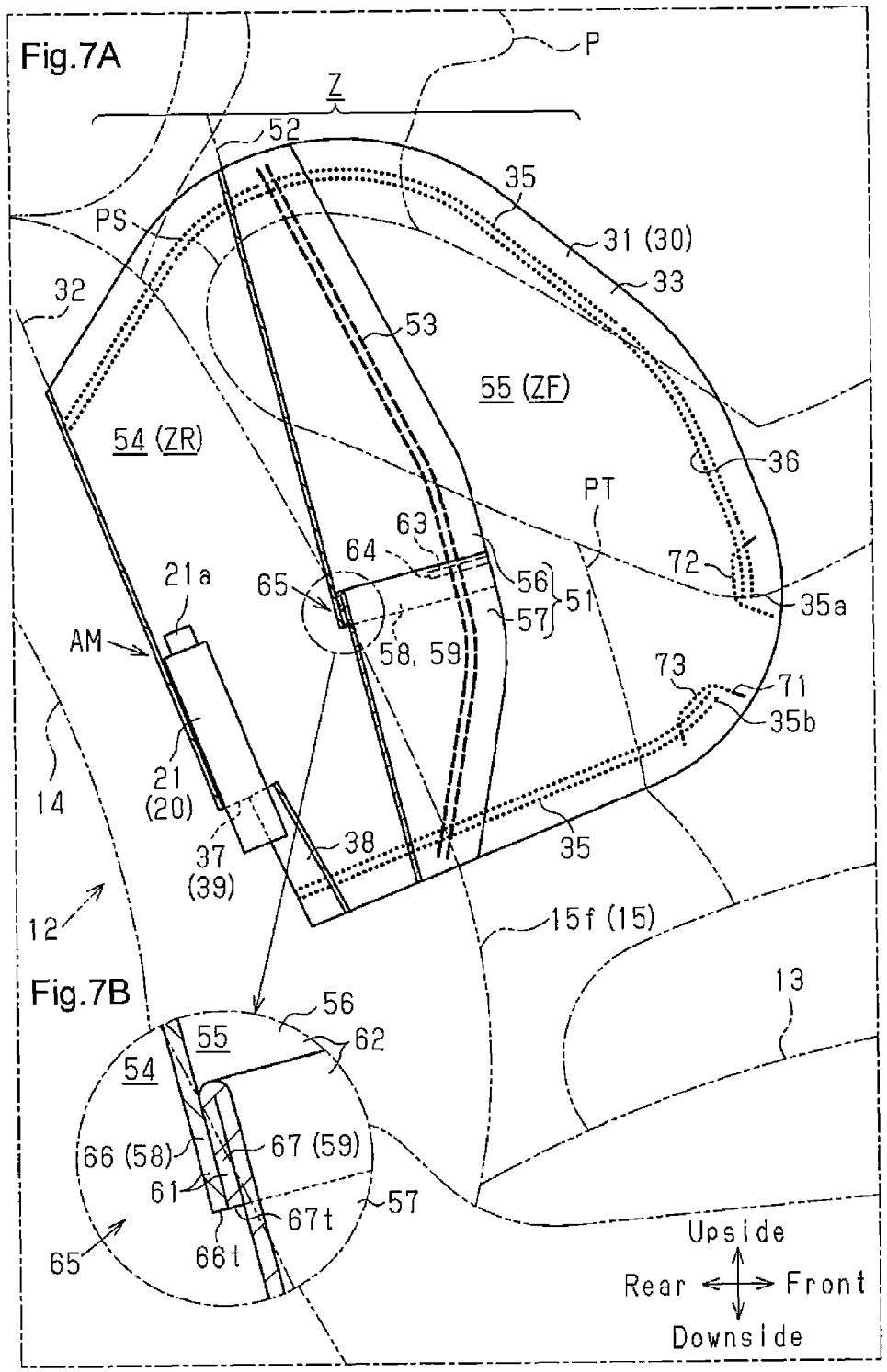
FIG. 7A is a partial cross-sectional side view of the embodiment of FIG. 1, illustrating, together with an occupant and a vehicle seat, the internal structure of the airbag module with the airbag main body in an uninflated and deployed state.
FIG. 7B is an enlarged partial cross-sectional side view illustrating a part of FIG. 7A.

The strength of the breakable portion 88 in the cover 84 is lower than the other parts of the cover 84. Thus, when pushed by the upstream inflation portion 54, the cover 84 is broken at the breakable portion 88. This separates the front wall portion 86 from the cover main body 85. As shown in FIG. 6, the cover main body 85 has the hinge portion 89, which is located at the rear end corresponding to the boundary with the rear wall portion 87. When the cover main body 85 is displaced sideways from the car seat 12 with the hinge portion 89 serving as the pivot, the storage portion 83 is opened. The cover main body 85 is then inclined to be separated away from the housing 81 toward the front end. With a part of the upstream inflation portion 54 (the part fixed to the side frame portion 16) remains in the storage portion 83, the remainder of the upstream inflation portion

54 is deployed and inflated along the cover main body 85 to be projected diagonally forward and sideways from the storage portion 83.

The continuously supplied inflation gas causes the upstream inflation portion 54 to go past a front end 84$f$ of the cover 84 and is deployed and inflated to a position forward of the front end 84$f$. When the inflation of the upstream inflation portion 54 is completed, the front end of the upstream inflation portion 54 is located forward of a front end 15$f$ of the side portion 15 of the seat back 14 (see FIG. 2). At this time, the position of the front end of the upstream inflation portion 54 is forward of the front end 84$f$ of the cover 84, that is, forward of the storage portion 83, and is located beside the rear protection area ZR of the occupant P.

In this state, the amount of inflation gas that flows into the downstream inflation portion 55 through the communication portion 64 and between the valve members 66, 67 of the pressure regulator valve 65 is small, and the internal pressure of the downstream inflation portion 55 is low. However, the downstream inflation portion 55 may be deployed (unfolded) without being inflated. This is because the forward movement of the upstream inflation portion 54 being deployed and inflated is transmitted to the downstream inflation portion 55.

As shown in FIG. 8, when pulled toward the opposite sides in the car widthwise direction, the vertical partition 51 is tensioned and restricts the increase in the thickness of the upstream inflation portion 54 due to inflation in the car widthwise direction.

The upstream inflation portion 54, which projects from the storage portion 83, has a part located forward of the front end 15$f$ of the side portion 15 of the seat back 14. This part starts pushing the rear protection area ZR of the occupant P inward when the body side portion 11 bulges further inward. This pushing motion restrains the occupant P to protect the occupant P from the impact.

In the state in which the valve members 66, 67 are in close contact with each other with the entire surfaces (substantially closed), external force is applied from the body side portion 11 while the inflation gas keeps being supplied to the upstream inflation portion 54. The external force causes the communication portion 64 and the pressure regulator valve 65 to start to open.

That is, the inflation portion 36 starts being deformed by external force that accompanies the restraint of the occupant P in the middle of the supplying period of inflation gas to the upstream inflation portion 54. This reduces the strong tension applied to the vertical partition 51 in the car widthwise direction.

The internal pressure PI of the upstream inflation portion 54 is further increased in accordance with the deformation of the inflation portion 36, and the vertical partition 51 is pushed toward the downstream inflation portion 55 (see FIG. 9B). Thus, the tension acting on the vertical partition 51 is changed to reduce the difference between the tension in the vertical direction and the tension in the lateral direction. Then, the communication portion 64 is permitted to be deformed, and the valve members 66, 67 are permitted to operate.

The overlapping portions 61 of the vertical partition 51 are overlapped with the non-overlapping portion 62 below, and are joined to the main body fabric portions 33, 34 by the vertical joint portions 53 at the ends in the car widthwise direction. Therefore, a strong force that acts to maintain the overlapped state is applied to the parts of the overlapping portions 61 close to the vertical joint portions 53. However, the force is reduced as the distance from the vertical joint portions 53 is increased, and the force is minimized at the center of the vertical partition 51 in the car widthwise direction. Thus, the overlapping portions 61, which are pulled in the vertical direction, are deformed in the vertical direction only at the valve members 66, 67 and in the vicinity thereof.

When the communication portion 64 is opened in the vertical direction, only the valve members 66, 67, which have received the high internal pressure PI of the upstream inflation portion 54, are pushed out into the downstream inflation portion 55 via the communication portion 64. When the width W1 of the communication portion 64 in the vertical direction is narrow, the distal ends 66$t$, 67$t$ contact each other to close the pressure regulator valve 65.

When the width W1 of the communication portion 64 is increased, the distal ends 66$t$, 67$t$ of the valve members 66, 67 are separated from each other as shown in FIG. 9C. The pressure regulator valve 65 is opened to cancel the restriction of flow of inflation gas. The inflating gas in the upstream inflation portion 54 is permitted to flow out to the downstream inflation portion 55 passing through the communication portion 64 and between the valve members 66, 67 in order.

As the inflation gas flows out to the downstream inflation portion 55, the internal pressure of the upstream inflation portion 54 starts decreasing. However, the body side portion 11 still continues bulging inward, and the upstream inflation portion 54 is pressed against the rear protection area ZR of the occupant P.

Also, the inflow of the inflation gas starts inflating the downstream inflation portion 55, so that the internal pressure of the downstream inflation portion 55 starts increasing. This causes the downstream inflation portion 55 to be unfolded (deployed) in the reverse order of that when it was folded. The downstream inflation portion 55 is deployed and inflated with an internal pressure lower than that of the upstream inflation portion 54 and beside the front protection area ZF (the thorax PT), which has a lower impact resistance than the rear protection area ZR, in the upper body of the occupant P.

Then, the body side portion 11 bulging inward starts pressing the downstream inflation portion 55 against the front protection area ZR of the occupant P. In addition to the restraint of the rear protection area ZR by the upstream inflation portion 54, the front protection area ZF starts being restrained by the downstream inflation portion 55. The impact from the side, which is transmitted to the protection area Z via the body side portion 11 is reduced by the inflation portion 36, which is formed by the upstream inflation portion 54 and the downstream inflation portion 55, so that the occupant P is protected.

Excess inflation gas in the downstream inflation portion 55 is discharged via the vent hole 71. The discharge of inflation gas lowers the internal pressure of the downstream inflation portion 55, allowing the downstream inflation portion 55 to restrain the front protection area ZF with an adequate pressing force.

The first embodiment as described above has the following advantages.

(1) The airbag main body 31 is stored in the storage portion 83, which is located in the side of the car seat 12 and fixed to the side frame portion 16. In response to an impact from the side of the car seat 12, inflation gas is supplied to deploy and inflate the airbag main body 31. The cover main body 85 forms at least a part of the cover 84 that is forward of the hinge portion 89 and is displaced sideways from the car seat 12 with the hinge portion 89 serving as the pivot to open the storage portion 83. This allows the airbag main body 31 to be deployed and inflated forward. In the side airbag apparatus having the above described configuration, the inflation portion 36 of the airbag main body 31 is divided into the upstream inflation portion 54, which is located on the rear side and receives inflation gas first, and the downstream inflation portion 55, which is located forward of the upstream inflation portion 54. The downstream inflation portion 55 receives the inflation gas via the upstream inflation portion 54. The upstream inflation portion 54 is inflated such that the front end is located forward of the front end 84*f* of the cover 84 (FIGS. 2 and 4).

This allows the upstream inflation portion 54 be quickly deployed and inflated. Thus, even if the clearance between the seat back 14 and the body side portion 11 is narrow, the cover 84 is quickly displaced to open the storage portion 83, so that the airbag main body 31 is quickly projected from the storage portion 83. After the deployment and inflation of the upstream inflation portion 54, the inflation gas is supplied to the downstream inflation portion 55 to quickly deploy and inflate the airbag main body 31 beside the occupant P, restraining and protecting the occupant P.

(2) The storage portion 83 and the cover 84 are provided in the side portion 15 of the seat back 14. The upstream inflation portion 54 is inflated such that the front end is located forward of the front end 15*f* of the side portion 15 (FIGS. 4 and 6).

Thus, in the upstream inflation portion 54, which has been projected from the storage portion 83, has a part that corresponds to the position forward of the front end 15*f* of the seat back 14. This part restrains and protects the occupant P at an early stage.

(3) The inside of the airbag main body 31 is divided by the vertical partition 51, which has a gas flow restricting portion, to form the upstream inflation portion 54 and the downstream inflation portion 55 (FIG. 7A).

Thus, at the early stage of supply of inflation gas to the airbag 30, only the upstream inflation portion 54 is deployed and inflated. The cover 84 is therefore quickly displaced to open the storage portion 83. The upstream inflation portion 54, which is projected from the storage portion 83, is therefore quickly deployed and inflated.

(4) The communication portion 64 and the pressure regulator valve 65, which are opened on the condition that the upstream inflation portion 54 receives external force due to restraint of the occupant, form gas flow restricting portion (FIGS. 7A, 9A to 9C).

Thus, even at an early stage of supply of inflation gas to the airbag 30 and before restraint of the occupant by the upstream inflation portion 54, the communication portion 64 and the pressure regulator valve 65 are both closed or substantially closed. This restricts the inflating gas in the upstream inflation portion 54 from flowing out to the downstream inflation portion 55 and via the communication portion 64 and the pressure regulator valve 65. The inflation gas is concentrated in the upstream inflation portion 54 to increase the internal pressure at an early stage, which quickly deploys and inflates the upstream inflation portion 54. When the upstream inflation portion 54 restrains the occupant, external force due to restraint of the occupant opens the communication portion 64 and the pressure regulator valve 65 to cancel the restriction of outflow of the inflation gas. The inflation gas is supplied to the downstream inflation portion 55, so that the downstream inflation portion 55 is deployed and inflated after the upstream inflation portion 54.

Second Embodiment

A car side airbag apparatus according to a second embodiment of the present invention will now be described with reference to FIGS. 10 to 13. The differences from the first embodiment will mainly be discussed.

Figure 10:
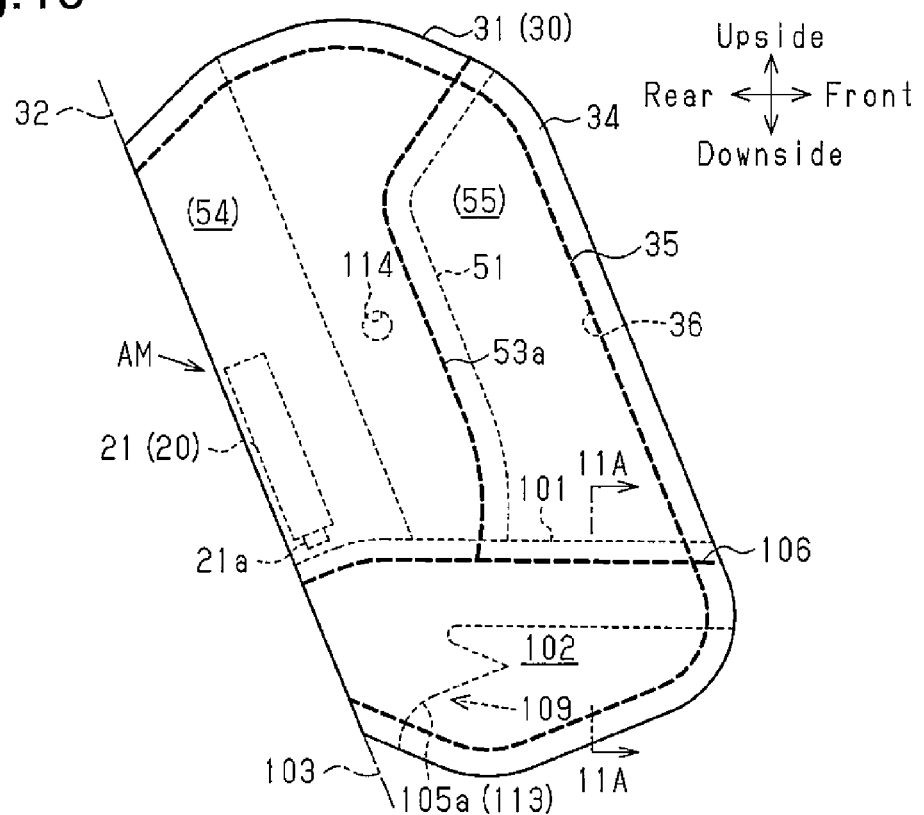
FIG. 10 is a side view showing a car side airbag apparatus according to a second embodiment, illustrating the airbag module with an airbag main body in an uninflated and deployed state.
Figures 11A, 11B:
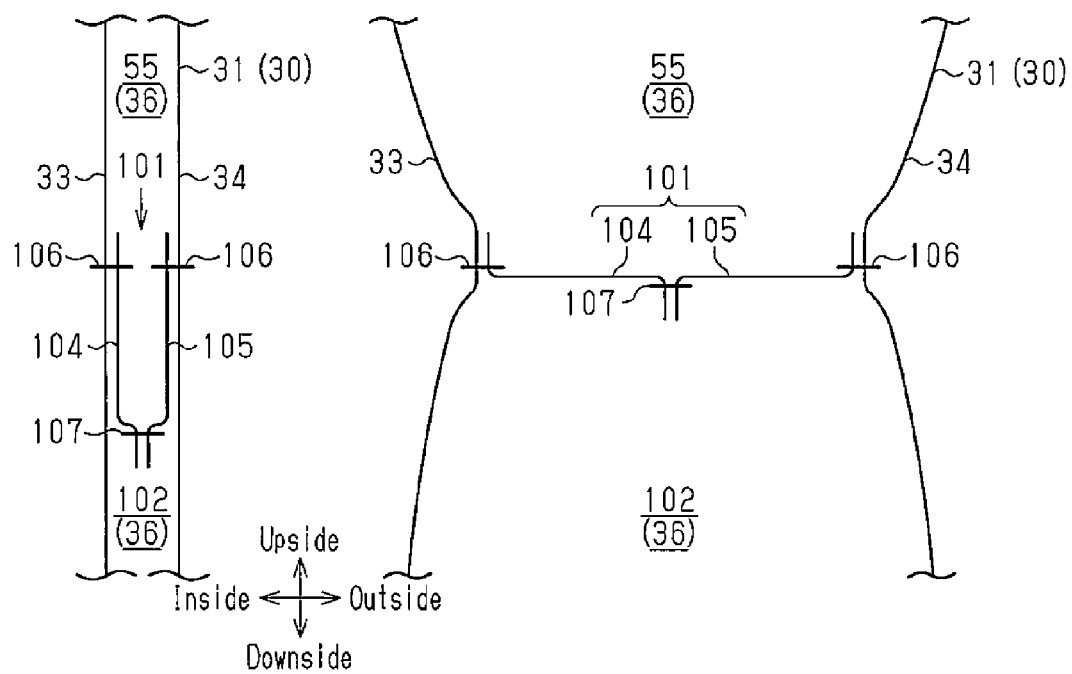
FIG. 11A is a partial cross-sectional view taken along line 11A-11A of FIG. 10, schematically showing a lower part of the internal structure of the airbag.
FIG. 11B is a partial cross-sectional view schematically showing the internal structure of the airbag lower part when the lateral partition of FIG. 11A is tensioned.
Figure 12:
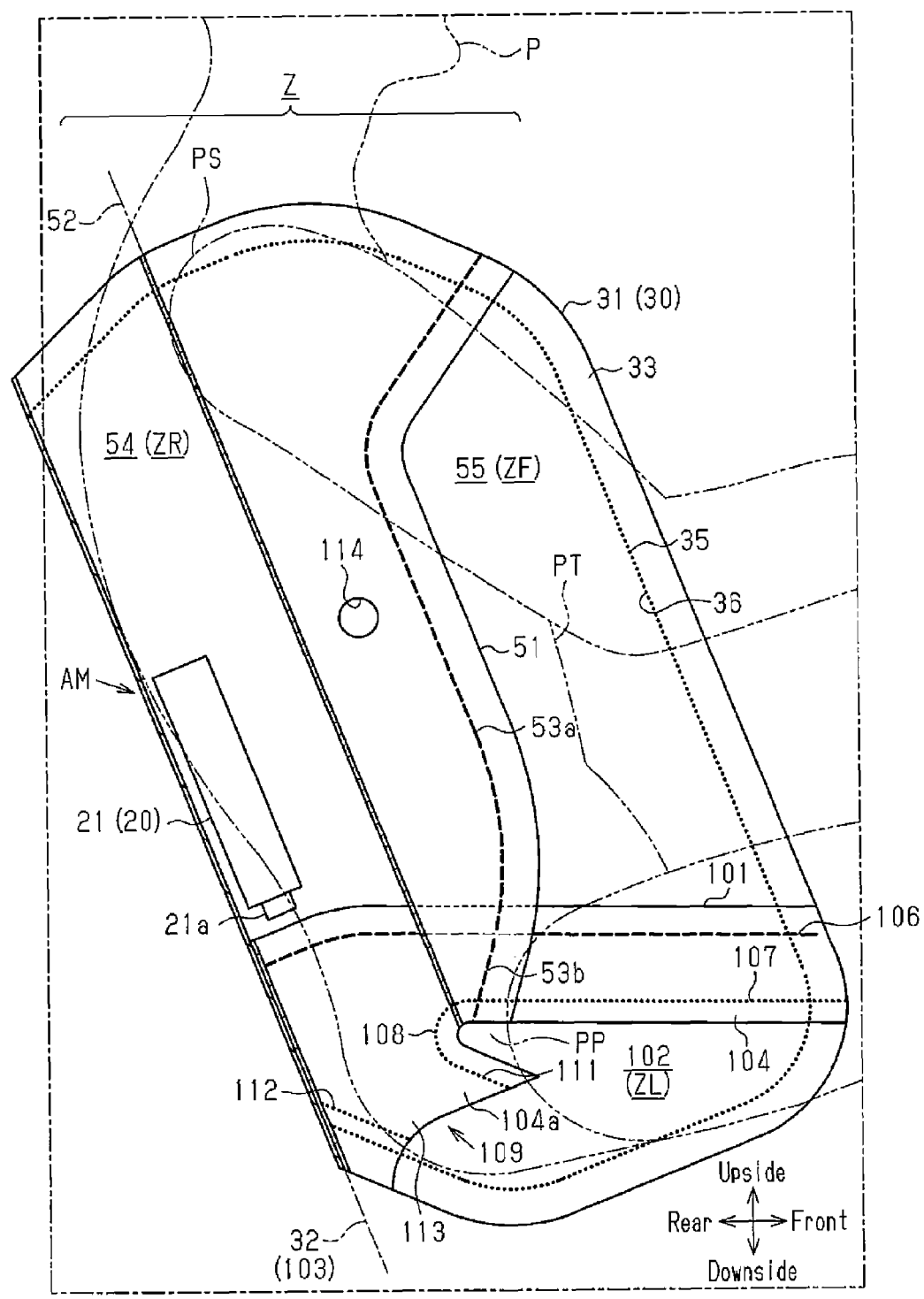
FIG. 12 is a partial cross-sectional side view showing the internal structure of the airbag module of FIG. 10, together with an occupant.
Figure 13:
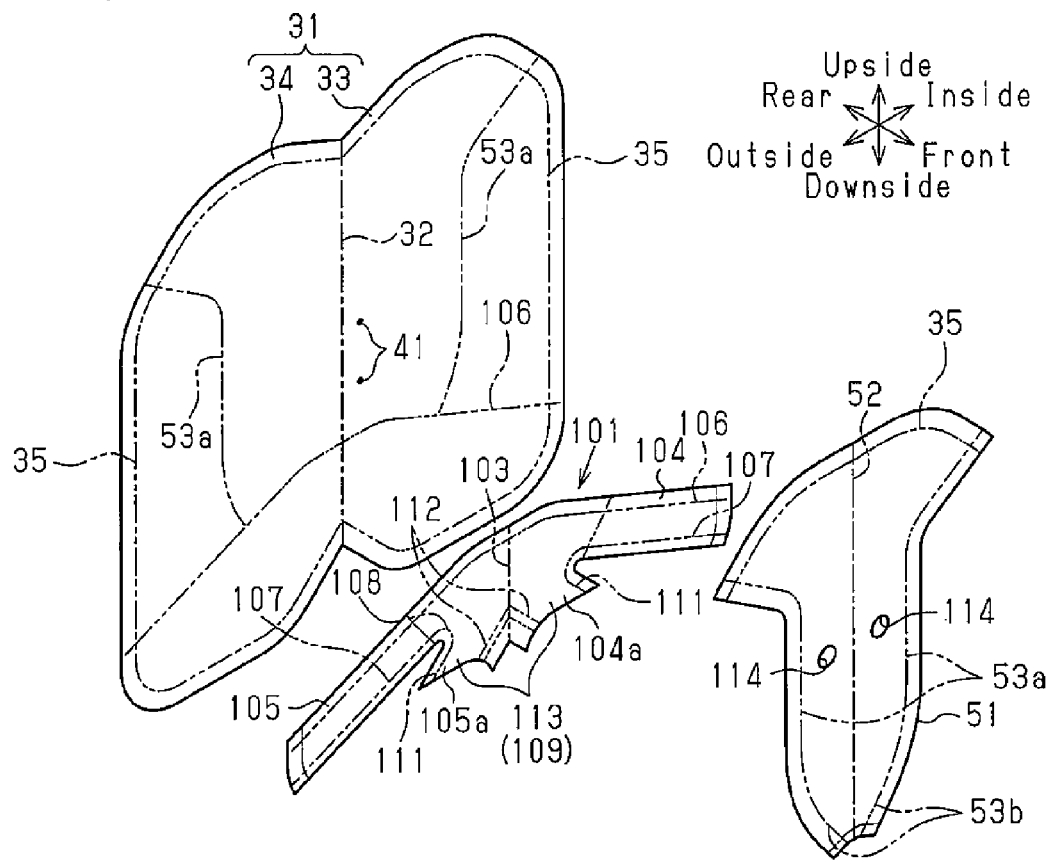
FIG. 13 is an exploded perspective view showing a spread state of the components of the airbag in the embodiment of FIG. 10.

FIG. 10 shows an airbag module AM in which an airbag main body 31 is in an uninflated and deployed state. FIG. 12 shows, together with an occupant P, the airbag module AM in which the airbag 30 of FIG. 10 is cut at the center portion of the car widthwise direction to show the internal structure of the airbag module AM. FIG. 13 shows components of the airbag 30 in a spread state.

In the second embodiment, as illustrated in FIG. 12, an area of the upper body of the occupant P seated in the car seat 12 ranging from the shoulder region PS to the lumbar region PP will be referred to as a protection area Z, which is protected by the airbag main body 31 (the inflation portion 36). The protection area Z includes a front protection area ZF, which includes the front part of the thorax PT, a rear protection area ZR, which includes the rear part of the thorax PT and the shoulder region PS, and a lower protection area ZL, which includes the lumbar region PP.

<Airbag Main Body 31>

The shapes and sizes of the main body fabric portions 33, 34 of the airbag main body 31 are set such that when the airbag main body 31 is deployed and inflated, the airbag main body 31 occupies a space beside the protection area Z. Thus, the airbag main body 31 extends downward and is longer than that in the first embodiment by the amount corresponding to the lower protection area ZL. In the second embodiment, the slit 37 and the inward folding portion 38 are not formed in the rear end of the upstream inflation portion 54. In other words, the insertion port 39 of the gas generator 20 is not formed in the rear end of the upstream inflation portion 54.

The inflation portion 36 is divided into the following three sections by a vertical partition 51 and a lateral partition 101.

One of the sections is an upstream inflation portion 54, which forms a part of the rear portion of the airbag main body 31 and to which inflation gas is supplied first. The upstream inflation portion 54 is deployed and inflated beside the rear protection area ZR of the occupant P.

The sections also include a downstream inflation portion 55 located forward of the upstream inflation portion 54 with the vertical partition 51 in between. The downstream inflation portion 55 is deployed and inflated beside the front protection area ZF.

The other section is a lower inflation portion 102 located below the upstream inflation portion 54 and the downstream inflation portion 55 with the lateral partition 101 in between. The lower inflation portion 102 is deployed and inflated beside the lower protection area ZL.

<Lateral Partition 101>

As shown in FIGS. 12 and 13, the lateral partition 101 is made of a material similar to that of the main body fabric portions 33, 34 of the airbag main body 31. The lateral partition 101 is formed by folding a single fabric piece in half along a folding line 103 extending vertically to be overlaid onto itself in the car widthwise direction, and placing the overlaid portion between lower parts of the main body fabric portions 33, 34. The lateral partition 101 may also be formed of two fabric pieces divided along the folding line 103. To distinguish the two parts of the lateral partition 101 overlapped in the car widthwise direction, the part located on the inner side is referred to as a structural fabric portion 104, and the part located on the outer side is referred to as a structural fabric portion 105.

The lateral partition 101 has extensions 104*a*, 105*a*, which extend forward and downward from rear portions of the structural fabric portions 104, 105 in the folded lateral partition 101. The lateral partition 101, which is folded in half, is located between the main body fabric portions 33, 34 with the folding line 103 matched with the folding line 32 of the airbag main body 31. The structural fabric portions 104, 105 of the lateral partition 101 are joined to the main body fabric portions 33, 34 by the side joint portions 106 located at the upper peripheral portions. The structural fabric portions 104, 105 are joined to each other by the side joint portions 107 located at the lower peripheral portions (see FIG. 11A). The front ends of the structural fabric portions 104, 105 of the lateral partition 101, which is folded in half, are sewn and joined to the front lower ends of the main body fabric portions 33, 34 by the peripheral joint portions 35.

<Vertical Partition 51>

Unlike the first embodiment, the vertical partition 51 is formed by a single fabric piece and folded forward in half along a vertical folding line 52. The upper end of the vertical partition 51 is sewn and joined to the upper ends of the main body fabric portions 33, 34 by the peripheral joint portions 35. The lower part of the vertical partition 51 is overlaid onto the structural fabric portions 104, 105 of the lateral partition 101. The lower end of the vertical partition 51 is sewn and joined to the lower ends of the structural fabric portions 104, 105 by the side joint portions 107.

In the part where the structural fabric portions 104, 105 of the lateral partition 101 are not overlapped, the vertical partition 51 is joined to the main body fabric portions 33, 34 by vertical joint portions 53*a* extending vertically along the peripheral portions on the opposite sides in the car widthwise direction. The vertical partition 51 bridges between the main body fabric portions 33, 34 by the above described joining operation by the vertical joint portions 53*a*. The vertical partition 51 is joined to the structural fabric portions 104, 105 by vertical joint portions 53*b*, which extend vertically in the vicinity of and blow the vertical joint portions 53*a* in a part overlapped with the structural fabric portions 104, 105.

As shown in FIGS. 10 and 12, an inflator 21, which has a gas outlet 21*a* at the lower end, is arranged at the rear end in the upstream inflation portion 54, while being held to extend vertically. Bolts 22 (see FIG. 4) are inserted into bolt holes (see FIG. 13) of the main body fabric portion 33, so that the gas generator 20 is positioned with respect to and secured to the upstream inflation portion 54.

As shown in FIGS. 12 and 13, the lateral partition 101 includes a communication portion 108 and a check valve 109, which serve as an auxiliary gas flow restricting portion.

<Communication Portion 108 and Check Valve 109>

The communication portion 108 is adapted for connecting the upstream inflation portion 54 and the lower inflation portion 102 to each other. The side joint portions 107 of the lateral partition 101, which is folded in half, are not joined to each other at the rear ends of the structural fabric portions 104, 105. These parts, which are not joined, form the communication portion 108.

The check valve 109 regulates flow of inflation gas at the communication portion 108. The check valve 109 allows inflation gas to flow from the upstream inflation portion 54 to the lower inflation portion 102 (inflow), but restricts the flow in the opposite direction (outflow).

Front peripheral portions of the extensions 104*a*, 105*a* of the lateral partition 101, which is folded in half, are joined to each other with joint portions 111 formed along the peripheral portions. The joint portions 111 are inclined to be lowered toward the front ends. The upper ends of the joint portions 111 are connected to the rear ends of the side joint portions 107.

The rear ends of the extensions 104*a*, 105*a* of the folded lateral partition 101 are joined to each other by joint portions 112, which diagonally extend forward and downward from the communication portion 108. Parts of the folded extensions 104*a*, 105*a* that are rearward of the joint portions 112 are sewn and joined to the rear lower ends of the main body fabric portions 33, 34 by the peripheral joint portions 35.

Parts of the extensions 104*a*, 105*a* that are surrounded by the communication portion 108 and the joint portions 111, 112 form a pair of valve members 113, which form the check valve 109. The check valve 109 allows flow of inflating gas when one of the valve members 113 is separated from the other. This state of the check valve 109 is referred to as a valve opening state. The check valve 109 restricts flow of inflation gas when the valve members 113 contact each other in at least parts thereof. This state of the check valve 109 is referred to as a valve closing state. The check valve 109 may be formed by a member separate from the lateral partition 101.

In place of the communication portion 64 and the pressure regulator valve 65 in the first embodiment, the vertical partition 51 includes an opening 114, which serves as a gas flow restricting portion.

<Opening 114>

The opening 114 is formed by a hole that connects the upstream inflation portion 54 and the downstream inflation portion 55 to each other. The opening 114 may be formed only in one position or multiple positions in the vertical partition 51.

The airbag main body 31 has a vent hole for discharging excess inflation gas in the downstream inflation portion 55 and another vent hole for discharging excess inflation gas in the lower inflation portion 102. These vent holes are omitted from FIGS. 10 to 13.

Other than these differences, the second embodiment is the same as the first embodiment. Thus, like or the same reference numerals are given to those components that are like or the same as the corresponding components described above in the first embodiment and detailed explanations are omitted.

Operation of the second embodiment, which is configured as described above, will now be described.

When an impact is applied to the body side portion 11 due to a side collision or the like while the car 10 is running, the inflator 21 discharges inflation gas from the gas outlet 21*a*, some of which is supplied to the upstream inflation portion 54. At this time, the amount of inflation gas that flows out to the downstream inflation portion 55 from the upstream inflation portion 54 via the opening 114 is smaller than the amount of inflation gas supplied to the upstream inflation portion 54 from the inflator 21. This increases the internal pressure of the upstream inflation portion 54.

The remainder of the inflation gas discharged from the gas outlet 21*a* flows to the check valve 109. During the period in which inflation gas is supplied to the check valve 109, a force that deforms the valve members 113 into a tubular shape is generated. Thus, the inflating gas passes through the communication portion 108 and through between the valve members 113 and flows into the lower inflation portion 102. The continuous supply of the inflating gas from the inflator 21 increases the internal pressure of the lower inflation portion 102.

In the second embodiment, the inflation portion 36 is divided into three sections, which are the upstream inflation portion 54, the downstream inflation portion 55, and the lower inflation portion 102 by the vertical partition 51 and the lateral partition 101. The airbag 30 is configured such that inflation gas is first supplied to the upstream inflation portion 54 and almost simultaneously to the lower inflation portion 102. The sum of the volumes of the upstream inflation portion 54 and the lower inflation portion 102 is smaller than the volume of the airbag 30 in a case in which the airbag 30 is formed by a single inflation portion 36. Thus, the internal pressures of the upstream inflation portion 54 and the lower inflation portion 102 start to increase earlier and to a higher level than the case in which the airbag 30 is formed by a single inflation portion.

As the internal pressures of the upstream inflation portion 54 and the lower inflation portion 102 increase, the upstream inflation portion 54 and the lower inflation portion 102 start being inflated. This causes the upstream inflation portion 54 and the lower inflation portion 102 to be unfolded (deployed) in the reverse order of that when these were folded. When deployed and inflated, the upstream inflation portion 54 and the lower inflation portion 102 push the cover 84. When being pushed, the cover 84 is broken at the breakable portion 88, so that the cover main body 85 is separated from the front wall portion 86 as shown in FIG. 6. When the cover main body 85 is displaced sideways from the car seat 12 with the hinge portion 89 functioning as the pivot, the storage portion 83 is opened. The cover main body 85 is then inclined to be separated away from the housing 81 toward the front end. With parts of the upstream inflation portion 54 and the lower inflation portion 102 (rear parts) remaining in the storage portion 83, the remainders of the upstream inflation portion 54 and the lower inflation portion 102 are deployed and inflated along the cover main body 85 to be projected diagonally forward and sideways from the storage portion 83.

Continuous supply of the inflation gas causes the upstream inflation portion 54 and the lower inflation portion 102 to be quickly deployed and inflated forward beside the car seat 12. When the inflation of the upstream inflation portion 54 is completed, the front end of the upstream inflation portion 54 is located forward of the front end 15f of the side portion 15 of the seat back 14.

As shown in FIG. 12, the upstream inflation portion 54 is deployed and inflated beside the rear protection area ZR. The lower inflation portion 102 is deployed and inflated beside the lower protection area ZL. The upstream inflation portion 54 and the lower inflation portion 102 push and move the occupant P inward at the rear protection area ZR and the lower protection area ZL. This increases the distance between the occupant P and the body side portion 11 and increases the space for deploying and inflating the downstream inflation portion 55.

As the upstream inflation portion 54 is inflated, the vertical partition 51 is pulled toward the opposite sides in the car widthwise direction by the parts of the main body fabric portions 33, 34 that form the upstream inflation portion 54. When the vertical partition 51 is pulled and tensioned, the increase in the thickness of the upstream inflation portion 54 due to the inflation in the car widthwise direction is restricted. Also, the lateral partition 101 is pulled toward the opposite sides in the car widthwise direction by parts of the main body fabric portions 33, 34 that form the upstream inflation portion 54 and the lower inflation portion 102 (see FIG. 11B). When the lateral partition 101 is pulled and tensioned, the increase in the thickness of the upstream inflation portion 54 and the lower inflation portion 102 due to inflation in the car widthwise direction is restricted.

The inflation gas that flows into the downstream inflation portion 55 from the upstream inflation portion 54 via the opening 114 inflates the downstream inflation portion 55. This increases the internal pressure of the downstream inflation portion 55 and causes the downstream inflation portion 55 to be unfolded (deployed) in the reverse order of that when it was folded.

The downstream inflation portion 55 is deployed and inflated with an internal pressure lower than that of the upstream inflation portion 54 beside the front half of the thorax PT (the front protection area ZF), which has a lower impact resistance than the shoulder region PS. In this state, the upstream inflation portion 54 and the lower inflation portion 102 have increased the space between the body side portion 11 and the upper body of the occupant P to provide the space for deploying and inflating the downstream inflation portion 55. Thus, the downstream inflation portion 55 is more easily deployed and inflated than a case in which the space between the body side portion 11 and the occupant P is not widened.

The lower inflation portion 102 is formed to bridge the upstream inflation portion 54 and the downstream inflation portion 55. Thus, the lower inflation portion 102 is deployed and inflated not only under the upstream inflation portion 54, but also under the downstream inflation portion 55. Thus, the lower inflation portion 102 is deployed and inflated forward in a wide range as compared to a case in which the lower inflation portion 102 is deployed and inflated only under the upstream inflation portion 54.

When the discharge of inflating gas from the inflator 21 stops and the inflating gas in the lower inflation portion 102 acts to flow to the upstream inflation portion 54, the valve members 113 of the check valve 109 are pushed by the high pressure in the lower inflation portion 102 and contact each other. The check valve 109 is thus closed and prevents the inflating gas in the lower inflation portion 102 from flowing out (reverse flow) to the upstream inflation portion 54 through between the valve members 113 and through the communication portion 108. The internal pressure of the lower inflation portion 102, which has been increased to a level adequate for protecting the lumbar region PP of the occupant P (the lower protection area ZL), is prevented from being reduced by the outflow of the inflation gas.

The second embodiment is different from the first embodiment in that the lateral partition 101, which has an auxiliary gas flow restricting portion (the communication portion 108 and the check valve 109), is provided. However, the second embodiment is similar to the first embodiment in that the vertical partition 51, which has a gas flow restricting portion, divides the inflation portion 36 at least into the upstream inflation portion 54 and the downstream inflation portion 55. Thus, the second embodiment has the same advantages as the above described advantages (1) to (4) of the first embodiment.

The above embodiments may be modified as follows.

<Regarding Inflation Portion 36>

The substantially entire airbag main body 31 is formed of the inflation portion 36 in the above illustrated embodiments. However, in addition to the inflation portion 36, the airbag main body 31 may be partially formed by a non-inflation portion, which is not supplied with inflation gas or inflated.

<Regarding Gas Flow Restricting Portion>

A lid sheet (not shown) may be provided at a position in the upstream inflation portion 54 or the downstream inflation portion 55 to cover the opening 114 in the second embodiment, so that the opening 114 and the lid sheet form a gas flow restricting portion. The lid sheet is joined to the vertical partition 51 with a joint portion that surrounds the opening 114. The joint portion is formed by sewing with sewing threads or adhesion using an adhesive. At least part of the joint portion may be broken when the internal pressure of the upstream inflation portion 54 exceeds a predetermined value (preset value).

In this case, when the internal pressure of the upstream inflation portion 54 is less than or equal to the predetermined value, the internal pressure is applied to the joint portion through the lid sheet, but the joint portion is not broken and continues to join the lid sheet to the vertical partition 51 around the opening 114.

When the joint portion is formed by applying adhesive to the vertical partition 51 continuously around the opening 114 in an annular form, the opening 114 is covered by the lid sheet, that is, the opening 114 and the lid sheet are closed.

In contrast, when the joint portion is formed by sewing, since the lid sheet is intermittently joined to the vertical partition 51 with threads, a small amount of inflation gas may leak through the seams. The opening 114 and the lid sheet are in a state close to the closed state (substantially closed state).

If the internal pressure of the upstream inflation portion 54 exceeds the predetermined value, and a great force is applied to the joint portion via the lid sheet, at least part of the joint portion is broken. As a result, the lid sheet no longer closes the opening 114, that is, the opening 114 and the lid sheet are opened. The inflating gas in the upstream inflation portion 54 is allowed to flow into the downstream inflation portion 55 after passing through the opening 114 and the lid sheet at the broken part.

In the second embodiment, the opening 114 may be replaced by the communication portion 64 and the pressure regulator valve 65 of the first embodiment, which serve as a gas flow restricting portion.

<Regarding Vertical Partition 51>

In each of the above embodiments, the peripheral portions of the vertical partition 51 in the car widthwise direction may be joined to the main body fabric portions 33, 34 in the upstream inflation portion 54 or in the downstream inflation portion 55. One of the peripheral portions may be joined to the associated one of the main body fabric portions 33, 34 in the upstream inflation portion 54, and the other peripheral portion may be joined to the associated one of the main body fabric portions 33, 34 in the downstream inflation portion 55.

In the first embodiment, parts of the overlapping portions 61 that function as the valve members 66, 67 are parts corresponding to the communication portion 64 in the car widthwise direction. Therefore, as long as at least the distal end portions 66t, 67t of the valve members 66, 67 are in contact with each other and are closed when the upstream inflation portion 54 is deployed and inflated, parts of the overlapping portions 61 that do not correspond to the communication portion 64 (parts separated from the communication portion 64) may be modified. For example, parts of the overlapping portions 61 that do not correspond to the communication portion 64 may be joined partially or entirely. The joining means may be sewing or adhering. According to this modification, only parts of the overlapping portions 61 that correspond to the communication portion 64 operate as the valve members 66, 67, and parts that do not correspond to the communication portion 64 are prevented from unnecessarily moving, for example, flapping. Further, a cutout portion may be formed at least at part of the portion of the overlapping portions 61 that does not correspond to the communication portion 64.

In the first embodiment, the vertical partition 51 may be formed by a member different from the members forming the valve members 66, 67.

In the first embodiment, the communication portion 64 may be provided at positions on the side joint portions 63 separate from the folding line 52 in a direction perpendicular to the folding line 52. Also, the communication portion 64 may be provided at multiple positions on the side joint portions 63. In these cases also, like the first embodiment, the valve members 66, 67 are provided around each communication portion 64.

In the first embodiment, the pair of overlapping portions 61, which includes the valve members 66, 66, may be arranged in the downstream inflation portion 55 instead of the upstream inflation portion 54 before the inflation portion 36 is deployed and inflated.

In the first embodiment, the vertical partition 51, which is folded in half, may be provided in the inflation portion 36 in the uninflated and deployed state with the folding line 52 located closer to the downstream inflation portion 55 than the vertical joint portions 53. In this case, the overlapping portions 61, which have the valve members 66, 67, may be located in the downstream inflation portion 55 before the inflation portion 36 is deployed and inflated.

<Regarding Upstream Inflation Portion 54>

In each of the embodiments, the upstream inflation portion 54, which has been projected from the storage portion 83, may be inflated such that the front end of the upstream inflation portion 54 is located between the front end 84f of the cover 84 and the front end 15f of the side portion 15 of the seat back 14.

In the first embodiment, an inner bag (not shown), which encompasses the inflator 21, may be provided in the rear part in the airbag main body 31, instead of the vertical partition 51, and the upstream inflation portion 54 may be formed by the inner bag. In this case, the downstream inflation portion 55 is formed by a part in the airbag main body 31 that surrounds the inner bag (the upstream inflation portion 54). A part of the downstream inflation portion 55 is located forward of the upstream inflation portion 54. The inner bag is provided with a gas flow restricting portion that is formed by the above described combination of the communication portion 64 and the pressure regulator valve 65 or by the opening 114. The inner bag, which is provided with the gas flow restricting portion, and the airbag main body 31 form the airbag 30.

<Regarding Case 80>

Instead of plastic material, the housing 81 may be formed of a metal plate.

Figure 14:
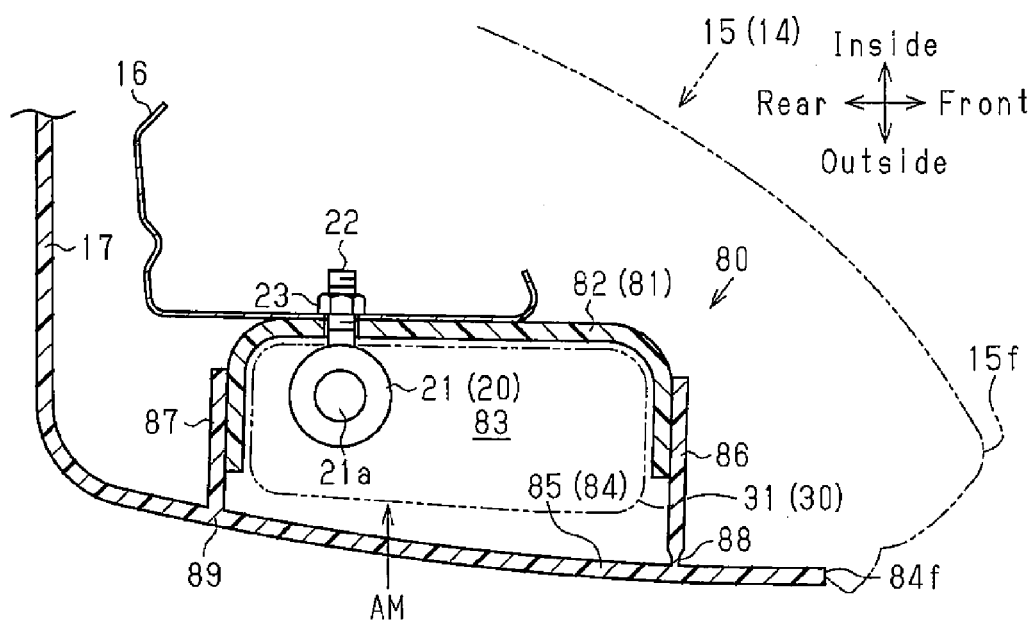
FIG. 14 is a partial cross-sectional plan view corresponding to FIG. 4, illustrating a modification in which a side of the back board of a seat back is extended forward to form a cover.

In the case of a seat back 14 shown in FIG. 14, which has a rear end formed by a back board 17 made of hard plastic, the outer side of the back board 17 may be is extended forward to form a cover main body 85.

In FIG. 14, the same reference numerals are given to those components that are the same as the corresponding components of the first embodiment. In this case, as in the first embodiment, the breakable portion 88 is broken so that the cover main body 85 is separated from the front wall portion 86 and displaced sideways with the hinge portion 89 functioning as the pivot.

The entire part of the cover 84 that is forward of the hinge portion 89 may be displaced sideways from the car seat 12 to open the storage portion 83.

<Regarding Lateral Partition 101>

The lateral partition 101 of the second embodiment is formed by a fabric piece bridging between the main body fabric portions 33, 34 of the airbag main body 31, that is, by a tether. The tether may be replaced by a seam formed by causing the main body fabric portions 33, 34 to contact each other and sewing the main body fabric portions 33, 34 together.

<Other Modifications>

The airbag main body 31 may be fixed to a member that has a strength different from that of the side frame portion 16 in the side portion 15 of the seat back 14.

In the first embodiment, while maintaining the configuration in which the interior of the airbag main body 31 is divided into the upstream inflation portion 54 and the downstream inflation portion 55 by the vertical partition 51, the airbag main body 31 may be expanded at least upward or downward, so that the area of the occupant P that is restrained and protected by the airbag 30 (the rear protection area ZR, the front protection area ZF) is expanded.

The present invention may be applied to a side airbag apparatus of a vehicle in which a seat 12 that faces in a direction other than the forward direction, for example, sideways. In this case, when an impact is applied to a side of the car seat 12 (in the front-rear direction of the car), the side airbag apparatus protects the occupant P from the impact.

Cars to which the side airbag apparatus according to the present invention is applied include various industrial vehicles in addition to private cars.

The side airbag apparatus can be applied to side airbag apparatuses that are mounted on vehicles other than cars, for example, airplanes, boats, and ships and protect an occupant seated in a vehicle seat from an impact.

The invention claimed is:

1. A side airbag apparatus comprising an airbag, the apparatus being adapted for installation in a vehicle seat, wherein
    the vehicle seat includes a seat back, which has a seat frame forming a framework of the seat back and an elastic seat pad provided about the seat frame, and a case provided on a side portion of the seat back,
    the case includes a housing, an interior space of which forms a storage portion for storing the airbag, and a cover for covering the storage portion,
    the housing and the cover are harder than the seat pad,
    the housing includes a front wall, a rear wall, and a side wall portion, which form the storage portion,
    the cover includes a cover main body, which has a front end and is located on an outer side of the housing, a front wall portion fixed to the front wall of the housing, a rear wall portion fixed to the rear wall of the housing, and a hinge portion provided at a boundary between the cover main body and the rear wall portion of the cover,
    the airbag is stored in the storage portion and fixed to the vehicle seat,
    in response to an impact from a side of the vehicle seat, inflation gas is supplied to deploy and inflate the airbag,
    the apparatus is configured such that at least a part that is forward of the hinge portion is displaced sideways from the vehicle seat with the hinge portion of the cover functioning as a pivot, so that the storage portion is opened to allow the airbag to be deployed and inflated forward,
    the airbag includes at least
    an upstream inflation portion that forms at least a rear part of the airbag and receives inflation gas, and
    a downstream inflation portion, at least a part of which is located forward of the upstream inflation portion, wherein the downstream inflation portion receives inflation gas that has flowed through the upstream inflation portion,
    an outline of the airbag is formed by an airbag main body,
    the upstream inflation portion and the downstream inflation portion are formed by dividing an inside of the airbag main body by a vertical partition, which has a gas flow restricting portion, and
    the upstream inflation portion has a front end that is located forward of the front end of the cover main body when the upstream inflation portion is inflated.

2. The side airbag apparatus according to claim 1, wherein the upstream inflation portion is inflated such that its front end is located forward of a front end of the side portion of the seat back.

3. The side airbag apparatus according to claim 1, wherein the gas flow restricting portion is formed by a communication portion, which connects the upstream inflation portion and the downstream inflation portion to each other, and a pressure regulator valve, which controls flow of inflation gas through the communication portion to adjust internal pressures of the upstream inflation portion and the downstream inflation portion, and the communication portion and the pressure regulator valve are configured to remain closed or substantially closed until a condition is met that the communication portion and the pressure regulator valve receive an external force due to restraint of an occupant by the upstream inflation portion and to be opened when the condition is met.

4. The side airbag apparatus according to claim 1, wherein the gas flow restricting portion is formed by an opening that connects the upstream inflation portion and the downstream inflation portion to each other.

5. The side airbag apparatus according to claim 1, wherein the housing is shaped like a box with an opening facing toward an outside of the vehicle,
    the side wall portion of the housing is shaped like a plate that extends in a front-rear direction and a vertical direction,
    the cover main body is shaped like a plate that extends in the front-rear direction and the vertical direction,
    the rear wall portion of the cover is shaped like a plate that extends inward from a rear end of the cover main body,
    the front wall portion of the cover is shaped like a plate that extends inward from between the front end and the rear end of the cover main body, and
    the cover further includes a breakable portion, which is provided at a boundary between the cover main body and the front wall portion of the cover and has a lower strength than the other parts of the cover to be broken by the airbag being deployed and inflated.

* * * * *